(12) United States Patent  (10) Patent No.: US 8,155,398 B2
Togashi  (45) Date of Patent: Apr. 10, 2012

(54) IMAGE PROCESSING APPARATUS, IMAGE PROCESSING METHOD AND COMPUTER PROGRAM

(75) Inventor: Haruo Togashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1112 days.

(21) Appl. No.: 12/013,050

(22) Filed: Jan. 11, 2008

(65) Prior Publication Data

US 2008/0187186 A1  Aug. 7, 2008

(30) Foreign Application Priority Data

Feb. 2, 2007  (JP) ................................. 2007-024026

(51) Int. Cl.
 *G06K 9/00* (2006.01)

(52) U.S. Cl. ........................................................ 382/118

(58) Field of Classification Search .................. 382/115, 382/118, 151, 209, 218, 224, 255
See application file for complete search history.

(56) References Cited

U.S. PATENT DOCUMENTS

| | | | | |
|---|---|---|---|---|
| 6,879,709 | B2 * | 4/2005 | Tian et al. | 382/118 |
| 7,187,786 | B2 * | 3/2007 | Kee | 382/118 |
| 7,362,887 | B2 * | 4/2008 | Oohashi et al. | 382/118 |
| 7,596,247 | B2 * | 9/2009 | Ioffe | 382/118 |
| 7,894,636 | B2 * | 2/2011 | Kozakaya | 382/118 |
| 2007/0053590 | A1 * | 3/2007 | Kozakaya | 382/181 |

FOREIGN PATENT DOCUMENTS

| | | |
|---|---|---|
| JP | 11-161791 | 6/1999 |
| JP | 2003-250036 | 9/2003 |
| JP | 2005-141318 | 6/2005 |
| JP | 2006-4003 | 1/2006 |
| JP | 2006-004003 | 1/2006 |
| JP | 2006-4041 | 1/2006 |
| WO | WO 03/019475 | 3/2003 |

OTHER PUBLICATIONS

Kim, et al. "Robust Face Recognition using AAM and Gabor Features", Jan. 2007, pp. 117-121.*
U.S. Appl. No. 11/950,929, filed Dec. 5, 2007, Togashi.
Office Action issued Apr. 19, 2011, in Japanese Patent Application No. 2007-24026.

* cited by examiner

*Primary Examiner* — Daniel Mariam
(74) *Attorney, Agent, or Firm* — Oblon, Spivak, McClelland, Maier & Neustadt, L.L.P.

(57) ABSTRACT

An image processing apparatus includes an image conversion section that receives an input of a face image to be identified, executes an image conversion on the input face image, and performs a normalization processing into an image. The image conversion section obtains a face image from a first memory storing the face image to be normalization processed, performs the normalization processing by an image conversion and stores the face image after the normalization processing into a second memory. The image processing apparatus includes a calculation section that calculates a conversion parameter for calculating a corresponding point in the first memory to each pixel position in the second memory. The conversion parameter defines one of an image contraction processing, an image rotation processing, or an image translation processing to be performed when the face image stored in the first memory is converted into the face image stored in the second memory.

16 Claims, 17 Drawing Sheets

IMAGE PROCESSING APPARATUS, IMAGE PROCESSING METHOD AND COMPUTER PROGRAM

CROSS REFERENCES TO RELATED APPLICATIONS

The present invention contains subject matter related to Japanese Patent Application JP 2007-024026 filed in the Japanese Patent Office on Feb. 2, 2007, the entire contents of which are incorporated herein by reference.

BACKGROUND OF THE INVENTION

1. Field of the Invention

The present invention relates to an image processing apparatus, image processing method and computer program. More particularly, the present invention relates to an image processing apparatus, image processing method and computer program which execute normalization processing of a face image included in captured image data, for example.

2. Description of the Related Art

Techniques for recognizing a face can be widely applied to man-machine interfaces, for example, to a user-friendly individual authentication system, gender identification, and the like. In the initial stages, recognition techniques using a side face were studied, but recognition techniques using a front image have currently become major techniques.

In a face recognition system, two kinds of processing are performed. One is face extraction processing which extracts a face pattern on the basis of feature information of a face from a captured image by a CCD camera, etc., and face identification processing which compares an extracted face pattern and a registered face image in order to identify a face of a specific person. For the face extraction processing and the face identification processing, it is possible to apply, for example, Gabor filtering which extracts a feature quantity of a face image using a plurality of filters having orientation selectivity and different frequency components (For example, refer to Japanese Unexamined Patent Application Publication No. 2006-4041).

It has already been proven that there are some cells having selectivity for a specific orientation in human visual cells. These include cells that respond to a vertical line and cells that respond to a horizontal line. A Gabor filter is a spatial filter including a plurality of filters having orientation selectivity in the same manner as the above.

A Gabor filter is spatially expressed by a Gabor function using a Gaussian function for a window and a sine function or a cosine function as a basis for a frequency response. The size of a filter window is, for example fixed to 24×24. Also, assuming that a frequency f has five types and an angle θ has eight directions, 40 types of Gabor filters are constituted.

The operation of a Gabor filter is the convolution of a pixel to which the Gabor filter is applied and the coefficients of the Gabor filter. The coefficients of a Gabor filter can be separated into the real part having a cosine function as a frequency response, and the imaginary part having a sine function as a frequency response. The convolution is applied to each of the above, and individual components are combined into a Gabor filter result including one scalar value. Such an operation is applied to maximum 40 types of Gabor filters while changing a frequency f and an angle θ. The obtained tuple of maximum 40 scalar values is called "Gabor jet". The Gabor jet as a local feature quantity is obtained for each feature-quantity extraction position detected at regular intervals in the horizontal direction and in the vertical direction on face image data. A Gabor jet has a characteristic which is invariable against a certain degree of shift and deformation of a feature-quantity extraction position.

In the face identification processing for identifying a specific person face, a comparison is made between the extracted face pattern and the registered face images. For the registered face images, the Gabor jets have been calculated for each feature-quantity extraction position in advance. Then the similarities of the Gabor jets of the input face and the Gabor jets of the registered face at the same feature-quantity extraction position are calculated, and a similarity vector, which is a set of the similarities at a plurality of feature-quantity extraction positions, is calculated. Next, class determination by a support vector machine (SVM) is carried out, and the input face image and the registered face image are recognized. The support vector machine calculates the value of the boundary surface of the similarity vector, for example the distance from the boundary surface (the surface of the position whose value is 0) to be determined to be +1 or −1, and determines which of the intra-personal class or the extra-personal class the similarity vector belongs to. If there is no similarity vector that is determined to belong to the intra-personal class, it is determined that an unrecorded person's face is input (for example, refer to B. sholkopf, et al., "Advance in Kernel Support Vector Learning" (The MIT Press, 1999.)). Also, one support vector machine learns (that is to say, registers) a lot of face images, thereby making it possible to determine whether a newly input face image matches a registered (learned) face image (belongs to the intra-personal class) or does not match (belongs to the extra-personal class) (for example, refer to Domestic Re-publication of PCT International Publication No. WO03/019475 and Japanese Unexamined Patent Application Publication No. 2006-4003). The support vector machine is evaluated to have the highest learning generalization ability in the field of pattern recognition by those skilled in the art.

As described above, in a face recognition system, two kinds of processing are performed: face extraction processing which extracts a face pattern on the basis of feature information of a face from a captured image by a CCD camera, etc., and face identification processing which compares an extracted face pattern and a registered face image in order to identify a face of a specific person. In the face identification processing, fitting processing on the face image extracted from an input image is performed as pre-processing of comparison processing in order to allow correct comparison processing with a registered image.

In the fitting processing, for example a face image recorded in a first memory is picked up and is subjected to normalization processing to be recorded into a second memory. Specifically, for example both-eye positions of a face image in the first memory are detected, the size of the face, the position of the face, and the angle of the face are obtained from the detected both-eye position information, and the face image in the first memory is contracted, shifted, and rotation converted such that the positions of the right eye and the left eye match fixed coordinates in the second memory in order to create a face image necessary for face recognition in the second memory as the fitting processing.

The face identification processing by the above-described Gabor filter is applied to an image after this fitting processing to achieve correct processing. That is to say, the similarities between the Gabor jet at the same feature-quantity extraction position of an input face and the Gabor jet of a registered face is calculated, a similarity vector, which is a set of the similarities at a plurality of feature-quantity extraction positions is obtained, and a class determination by a support vector machine (SVM) is made to perform face identification based on the matching between the input face image and a registered face image.

In the normalization processing as the above-described fitting processing, the normalization processing in which image conversion including contraction, shifting, and rotation processing is performed on a face image in the first memory, and the execution result is created in the second memory. In this image conversion processing, in general, processing is performed using an origin fixed on each memory as a center. For example, specifically, affine transformation is performed by setting the origin coordinates of the first memory and the origin coordinates of the second as center coordinates to perform memory image conversion including contraction, shifting, and rotation processing.

However, for example, when image conversion by affine transformation is performed, as a distance from an origin becomes larger, an error is apt to occur more often. On the other hand, the above-described determination of similarities by the Gabor jets, which is performed as the determination processing of the similarities between an input face image and a registered face image in face identification processing, is performed as determination processing based on the similarities of the positions and shapes of mainly face parts, that is to say, face parts such as eyes, a nose, a mouth, etc.

Accordingly, if the image conversion processing by affine transformation is performed, for example using an origin that is set outside of a face image as a center, an error occurs in the position or the shape of face parts, such as eyes, a nose, a mouth, etc., which is important information for extracting feature quantity to become important for face identification processing, and the determination of the similarities with a registered face image might not be performed correctly.

SUMMARY OF THE INVENTION

The present invention has been made in view of these points. It is desirable to provide an image processing apparatus, image processing method and computer program which perform image conversion with the suppression of the occurrence of an error in the positions and the shapes of face parts, which become important at the time of face identification processing, such as eyes, a nose, a mouth, etc., in the image conversion of an input image to be performed as pre-processing of the image identification processing.

According to an embodiment of the present invention, there is provided an image processing apparatus for performing identification processing of an input face image, including: an image conversion section receiving input of the face image to be identified, executing image conversion on the input face image, and performing normalization processing into an image having a predetermined setting; a similarity calculation section calculating similarities between a feature quantity obtained from the converted input image in the image conversion section and a feature quantity of a registered image; and matching determination mean determining whether the input face image matches the registered face image on the basis of the similarities calculated by the similarity calculation section, wherein the image conversion section executes the normalization processing by image conversion processing using a center of right and left eyes of the input face image as an origin.

In the embodiment of present invention, the image conversion section may obtain a face image from a first memory storing the face image to be normalization processed, perform the normalization by image conversion, and store the face image after the normalization into a second memory, and may include a calculation section calculating a conversion parameter for calculating a corresponding point in the first memory to each pixel position in the second memory, a coordinate conversion section calculating the corresponding point in the first memory to each pixel position in the second memory on the basis of the conversion parameter calculated by the calculation section, and an interpolation processing section determining a pixel value corresponding to each pixel position in the second memory in accordance with corresponding point information calculated by the coordinate conversion section.

In the embodiment of present invention, the calculation section may calculate, as the conversion parameter, a conversion parameter defining at last any one of image contraction processing, image rotation processing, or image translation processing to be performed when the face image stored in the first memory is converted into the face image stored in the second memory, and the coordinate conversion section may apply the conversion parameter defining at least any one of the image contraction processing, the image rotation processing, or the image translation processing to perform processing to calculate a corresponding point in the first memory to each pixel position in the second memory.

In the embodiment of present invention, the coordinate conversion section may calculate coordinates (s1x, s1y) in the first memory, which is an image storage memory before the normalization, using coordinates (s2x, s2y) in the second memory by expressions as follows:

$$s1x = (c/P) \times ((s2x) \times \cos\theta + s2y \times \sin\theta) + (\text{org\_}s1x\_\text{frc})$$

$$s1y = (c/P) \times ((-s2x) \times \sin\theta + s2y \times \cos\theta) + (\text{org\_}s1y\_\text{frc})$$

where s1x is an x-coordinate in the first memory coordinate system, s1y is a y-coordinate in the first memory coordinate system, s2x is an x-coordinate in the second memory coordinate system, s2y is a y-coordinate in the second memory coordinate system, and an image contraction processing parameter, an image rotation parameter, image translation processing parameters, which are input from the calculation section, are (c/P), θ, (org_s1x_frc) and (org_s1y_frc), respectively.

In the embodiment of present invention, the translation processing parameters (org_s1x_frc, org_s1y_frc) may be information indicating a position corresponding to an origin of the second memory in the first memory coordinate system.

In the embodiment of present invention, the interpolation processing section may perform pixel-value interpolation processing to which a bi-linear method or a bi-cubic method is applied using the corresponding point information calculated by the coordinate conversion section.

In the embodiment of present invention, the similarity calculation section may include Gabor filter application means performing convolution operation of the Gabor filter coefficients and a pixel while changing a frequency and an angle of a response function of a Gabor filter spatially expressed by a Gabor function using a Gaussian function for a window and a sine function or a cosine function as a basis for a frequency response for each feature-quantity extraction position of the converted input image converted by the image conversion section and obtaining a Gabor jet including a number of scalar values corresponding to a filter type, and similarity operation means calculating similarities between the Gabor jets of the input face image and the Gabor jets of the registered face image for each feature-quantity extraction position, and obtaining a similarity vector including a set of similarities in a plurality of feature-quantity extraction positions, wherein the matching determination mean determines whether the input face image matches the registered face image on the basis of the similarity vector.

According to another embodiment of the present invention, there is provided a method of processing an image for performing identification processing of an input face image in an image processing apparatus, the method including the steps of: converting an image by an image conversion section receiving input of the face image to be identified, executing image conversion on the input face image, and performing normalization processing into an image having a predetermined setting; calculating similarities, by a similarity calculation section, between a feature quantity obtained from the converted input image in the step of converting an image and a feature quantity of a registered image; and matching determining by a matching determination section determining whether the input face image matches the registered face image on the basis of the similarities calculated by the step of calculating similarities, wherein the step of converting an image includes executing the normalization processing by image conversion processing using a center of right and left eyes of the input face image as an origin.

In the embodiment of present invention, the step of converting an image may include obtaining a face image from a first memory storing the face image to be normalization processed, performing the normalization by image conversion, and storing the face image after the normalization into a second memory, and include calculating a conversion parameter by a calculation section for calculating a corresponding point in the first memory to each pixel position in the second memory, converting coordinates by a coordinate conversion section calculating a corresponding point in the first memory to each pixel position in the second memory on the basis of the conversion parameter calculated by the step of calculating, and interpolation processing by an interpolation processing section determining a pixel value corresponding to each pixel position in the second memory in accordance with the corresponding point information calculated by the step of converting coordinates.

In the embodiment of present invention, the step of calculating may calculate, as the conversion parameter, a conversion parameter defining at last any one of image contraction processing, image rotation processing, or image translation processing to be performed when the face image stored in the first memory is converted into the face image stored in the second memory, and the step of converting coordinates applies a conversion parameter defining at least any one of the image contraction processing, the image rotation processing, or the image translation processing to perform processing to calculate a corresponding point in the first memory to each pixel position in the second memory.

In the embodiment of present invention, the step of converting coordinates may calculate coordinates (s1x, s1y) in the first memory, which is an image storage memory before normalization, using coordinates (s2x, s2y) in the second memory by expressions as follows:

$$s1x = (c/P) \times ((s2x) \times \cos\theta + s2y \times \sin\theta) + (org\_s1x\_frc)$$

$$s1y = (c/P) \times ((-s2x) \times \sin\theta + s2y \times \cos\theta) + (org\_s1y\_frc)$$

where s1x is an x-coordinate in the first memory coordinate system, s1y is a y-coordinate in the first memory coordinate system, s2x is an x-coordinate in the second memory coordinate system, s2y is a y-coordinate in the second memory coordinate system, and an image contraction processing parameter, an image rotation parameter, image translation processing parameters, which are input from the calculation section, are (c/P), θ, (org_s1x_frc) and (org_s1y_frc), respectively.

In the embodiment of present invention, the translation processing parameters (org_s1x_frc, org_s1y_frc) may be information indicating a position corresponding to an origin of the second memory in the first memory coordinate system.

In the embodiment of present invention, the step of interpolation processing may perform pixel-value interpolation processing to which a bi-linear method or a bi-cubic method is applied using the corresponding point information calculated by the coordinate conversion section.

In the embodiment of present invention, the step of calculating similarities may include Gabor filter application means performing convolution operation of the Gabor filter coefficients and the pixel while changing a frequency and an angle of a response function of a Gabor filter spatially expressed by a Gabor function using a Gaussian function for a window and a sine function or a cosine function as a basis for a frequency response for each feature-quantity extraction position of the converted input image converted by the image conversion section and obtaining a Gabor jet including a number of scalar values corresponding to a filter type and, similarity operation means calculating similarities between the Gabor jets of the input face image and the Gabor jets of the registered face image, and obtaining a similarity vector including a set of similarities in a plurality of feature-quantity extraction positions, wherein the step of matching determining performs matching determination processing on whether the input face image matches the registered face image on the basis of the similarity vector.

According to another embodiment of the present invention, there is provided a computer program for causing an image processing apparatus to perform identification processing of an input face image, the computer program including the steps of:

converting an image by an image conversion section receiving input of the face image to be identified, executing image conversion on the input face image, and performing normalization processing in an image having a predetermined setting;

calculating similarities, by a similarity calculation section, between a feature quantity obtained from the converted input image in the step of converting an image and a feature quantity of a registered image; and matching determining by a matching determination section determining whether the input face image matches the registered face image on the basis of the similarities calculated by the step of calculating similarities, wherein the step of converting an image includes executing the normalization processing by image conversion processing using a center of right and left eyes of the input face image as an origin.

In this regard, the computer program of the present invention is a computer program capable of being provided by a storage medium or a communication medium, which is provided in a computer-readable format, for example a recording medium, such as a DVD, a CD, an MO, etc., or a communication medium, such as a network, etc., for a computer system capable of performing various program code. By providing such a program in a computer-readable format, the processing in accordance with the program is performed in a computer system.

The other features and advantages of the present invention will become apparent by a detailed description of the present invention, which is described below with reference to an embodiment of the present invention and the accompanying drawings. In this regard, in this specification, a system means a logical set of a plurality of apparatuses, and each constituent apparatus is not limited to be housed in a same case.

By the configuration of an embodiment of the present invention, in the image conversion of an input face image, which is performed as pre-processing of face identification processing by the determination of the similarities between an input image and a registered image, the normalization processing is performed by the image conversion processing with the setting of the center of the right and left eyes of an input face image. Specifically, the origin of the SRAM storing the face image before the normalization is set to the center of the right and left eye positions, which is the point between the pixels. The origin of the SRAM storing the face image after the normalization is set to a fixed pixel point, and the normalization processing having different coordinates between before normalization and after normalization. Accordingly, image conversion processing is performed with the suppression of the occurrence of an error in the positions and the shapes of face parts, which become important at the time of face identification processing, such as eyes, a nose, a mouth, etc. Thus, it becomes possible to determine the similarities with a registered image correctly, and the face identification processing with high precision is performed.

DESCRIPTION OF THE PREFERRED EMBODIMENTS

In the following, a detailed description will be given of an image processing apparatus, image processing method and computer program of the present invention with reference to the drawings.

As already described, a face recognition system includes face extraction processing which extracts a face image from an input image, and face identification processing in which matching between the extracted face image and a registered image is performed in order to identify to which registered image the input image corresponds. Here, first, definitions will be given again to face detection processing and face identification processing.

Face detection is processing for detecting a human face and obtaining the position and the size thereof from a certain image (corresponding to one sheet of picture or one picture (field or frame)). Sometimes there are a plurality of faces in one picture. On the other hand, face identification means the identification of whether one detected face is the same as a face of a person who has been registered before.

Figure 1:
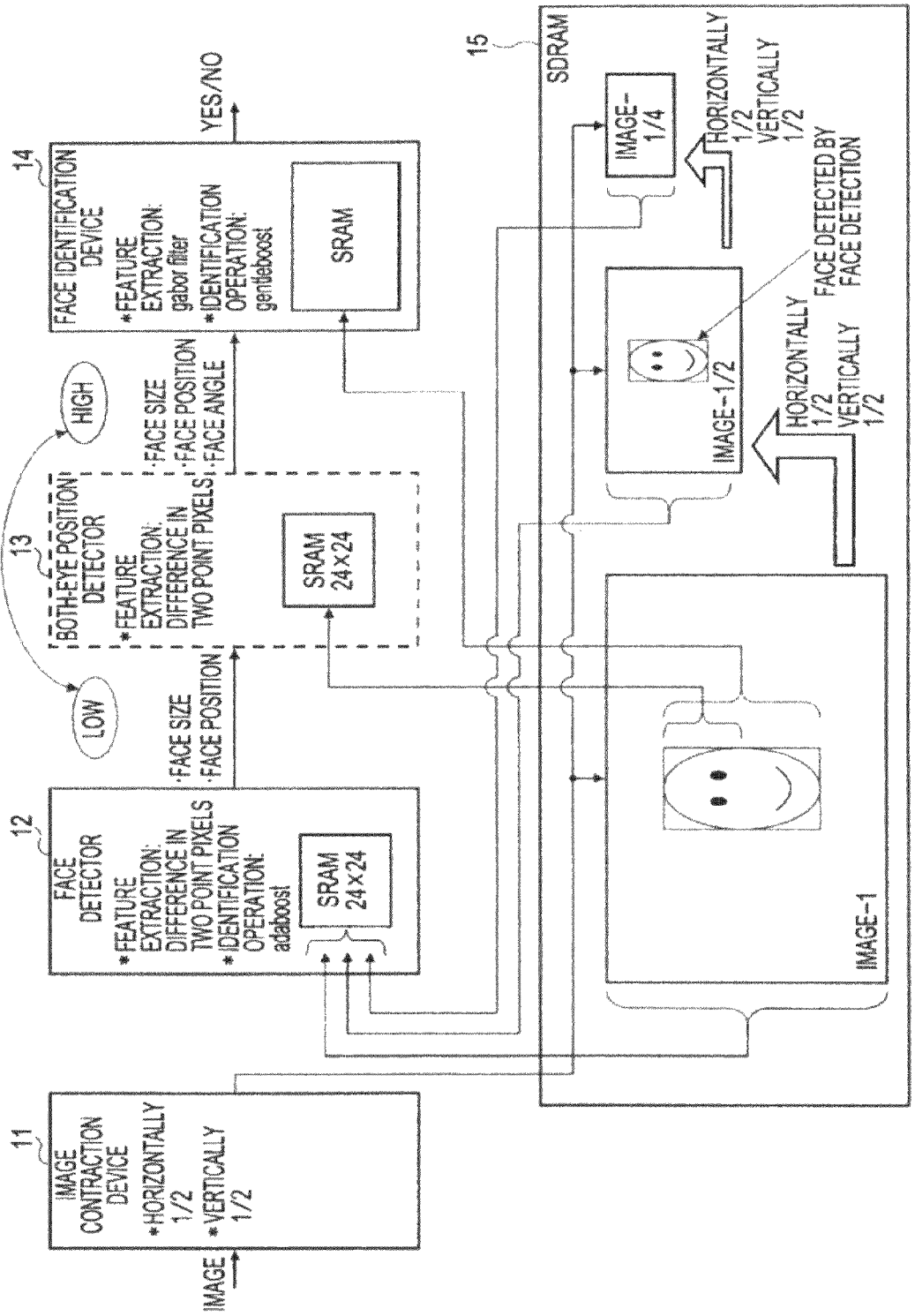
FIG. 1 is a diagram schematically illustrating an overall configuration of a face recognition system according to an embodiment of the present invention.

FIG. 1 schematically illustrates an overall configuration of a face recognition system according to an embodiment of the present invention. The face recognition system 1 shown in the figure includes an image contraction device 11, a face detector 12, a both-eye position detector 13, a face identification device 14, and a memory (SDRAM) 15 storing a plurality of images. Also, the face detector 12, the both-eye position detector 13, and the face identification device 14 internally includes a local memory (SRAM), respectively. An input to the system 1 is an image, and an output (Yes/No) from the system 1 is a flag indicating whether an input face image and a registered face image is of the same person.

The image contraction device 11 creates a contracted image by contracting an input image to ½ both in a horizontal direction and in a vertical direction, and stores the contracted image together with an original input image into an SDRAM (Synchronous DRAM) 15. In an example shown in FIG. 1, an input image is called an image-1, an image produced by contracting an input image to ½ both in the horizontal direction and the vertical direction is called an image-½, and an image produced by contracting an input image to ¼ both in the horizontal direction and the vertical direction is called an image-¼. These three images are produced and stored into the SDRAM 15.

At the time of creating contracted images, it is desirable to create individual images directly from an input image in consideration of calculation precision. However, in consideration of the scale of a hardware, a method of contracting an image to ½ in sequence may be used, that is to say, first, an image-½ may be created from an input image (image-1), and then an image-¼ may be created from the created image-½.

The face detector 12 detects a face from an input image and all the contracted images stored in the SDRAM 15, and obtains the sizes and the positions of the detected faces. For the detection of a face position, it is possible to easily detect the entire image unless the processing speed is considered.

On the other hand, for the detection of faces of various sizes, it is a matter of a relative relationship between the resolution of an image and the size of a face to be detected, and thus the following two ways are considered. One is a way of fixing the resolution of an image (that is to say, a way in which face detectors of various sizes are provided for an input image) and the other is a way of fixing the size of a face to be detected (a way in which an input image is contracted to have various resolutions using one face detector that can detect only a fixed-size face). The latter way is more realistic than the former way. Accordingly, as shown in FIG. 1, the face detector 12 identifies whether there is a face in 24×24 pixels for each of the contracted faces, image-1, image-½, and image-¼, which are created by the image contraction device 11.

In this regard, if the scale of the contraction ratio, ½ or ¼ is too rough to have enough precision, for example the image contraction device 11 further creates images having contraction ratios of image-⅞, image-⅝, and image-⅜, and the face detector 12 should perform face detection on the images having individual contraction ratios.

For feature extraction of face detection, two-point pixel difference method can be applied. This is a method in which the difference in pixels of two points which are easy to extract a face feature in 24×24 pixels is calculated for various two points. Also, it is possible to use the adaboost algorithm as an operation of the identification device.

In the both-eye position detector 13, the both-eye positions are detected, as preparation for recognizing a face image by identifying the positions of right and left eyes in order to normalize a face of an image whose resolution has been increased on the face detected by the face detector 12. That is to say, the both-eye positions are detected, and the face size, the face position, and the face angle of the face image whose resolution has been increased are obtained from the face size and the face position detected by the face detection.

The face detector 12 performs face detection with a resolution of 24×24 pixels, and the face identification device 14 performs face recognition with a resolution of 60×66 pixels. To put it differently, the resolution necessary for the face identification device 14 is demanded to be higher than that of the face detector 12. Thus, assuming that a face detected by the face detector is the image-½, right and left eyes are detected in the place where the same face appears in the image-1 having a higher resolution and in the upper portion of the face.

For feature extraction of both-eye position detection, two-point pixel difference method can be applied. The area to which the two-point pixel difference method is applied includes 24×24 pixels. This is the same as the case of the face detector 12, and thus the processing can be performed by the same hardware as in the case of the face detector 12 by serializing the processing time.

The face identification device 14 obtains the size, the position, and the angle of the face image from which right and left eye positions are identified by the both-eye position detector 13, the face is normalized in accordance with those, and then the face is once stored in the internal SRAM of 60×66 pixels to be determined whether to match a registered image.

The face identification device 14 applies, for example Gabor filtering for feature extraction of face recognition. Also, gentleboost is used for the operation of the identification device. The similarities are obtained between the result produced by applying a Gabor filter to the normalized face image and the result produced by applying a Gabor filter to the image registered before. The obtained similarities are subjected to gentleboost in order to identify whether the normalized face image matches the registered image.

Figure 2:
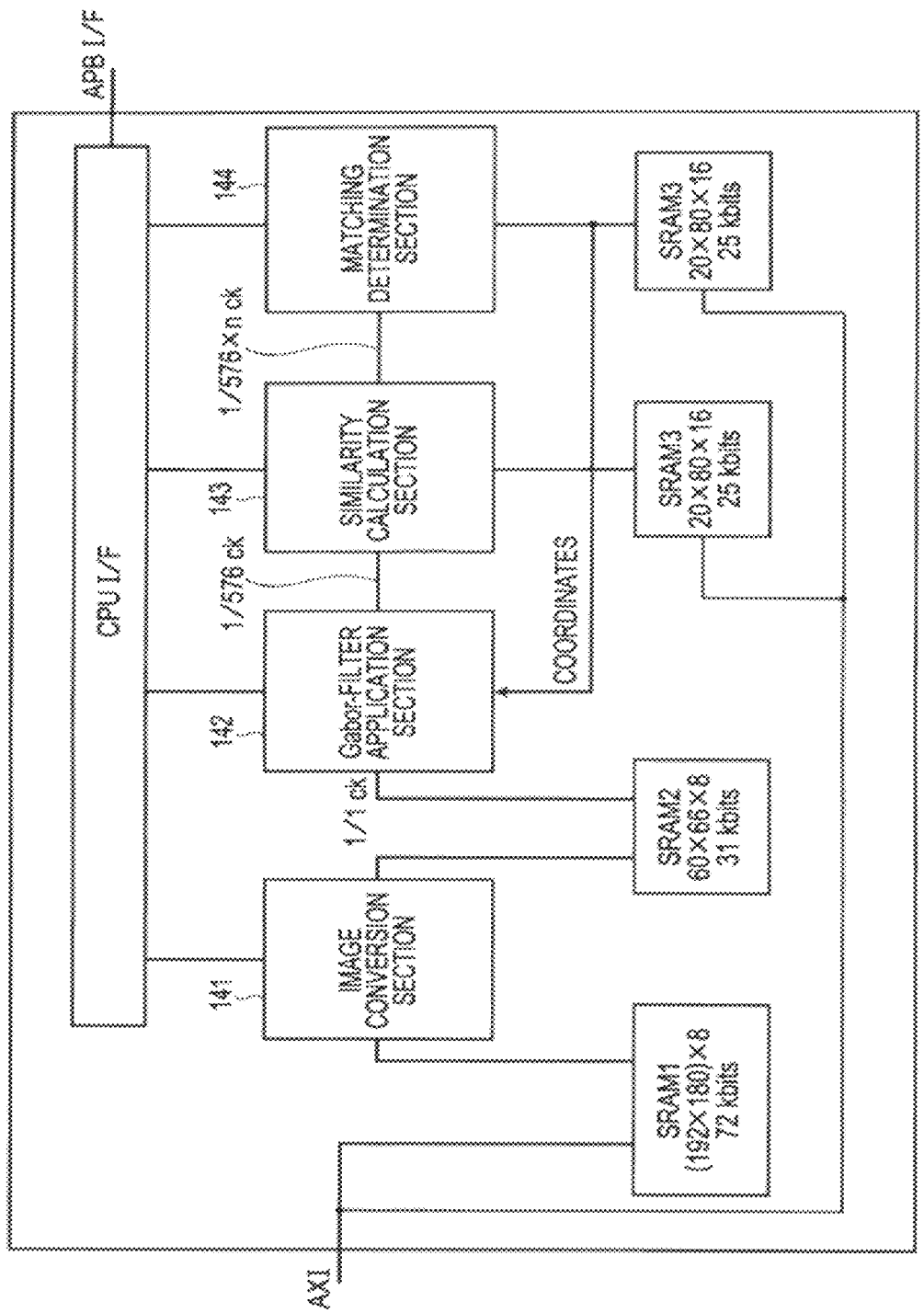
FIG. 2 is a diagram illustrating an example of a configuration of a face identification device 14.

FIG. 2 illustrates an example of a configuration of the face identification device 14. The face identification device 14 shown in the figure includes an image conversion section 141, a Gabor-filter application section 142, a similarity calculation section 143, and a matching determination section 144.

First, the image conversion section 141 transfers the face image having a resolution necessary for face identification from the SDRAM 15 to the SRAM1, which is local for the face identification device 14, on the basis of the both-eye position information detected by the both-eye position detection. Next, the size of the face, the position of the face, and the angle of the face are obtained from the both-eye position information, the normalization processing by the image conversion of the face image in the SRAM1 is performed, and the face image necessary for the face identification processing is created and stored into an SRAM2, which is a local memory provided in the face identification device 14.

Figure 3:
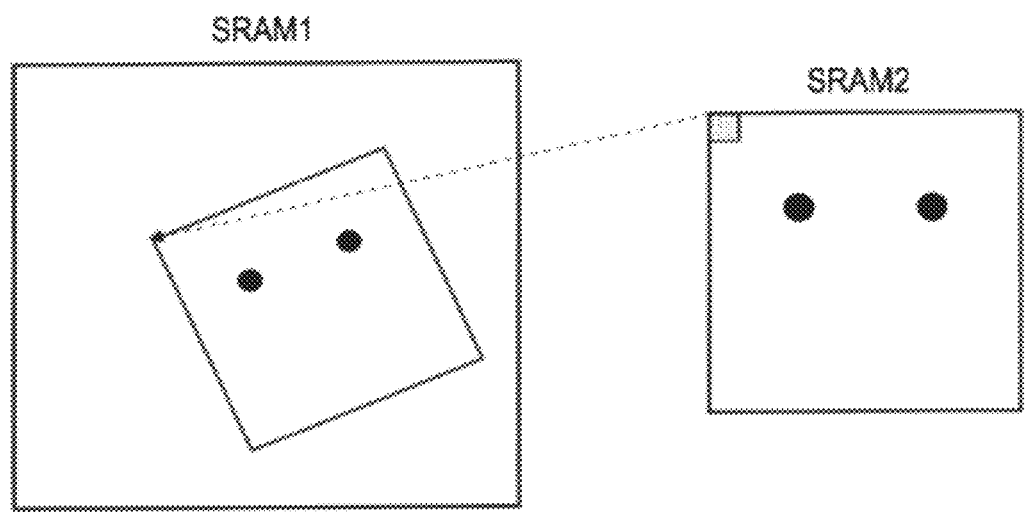
FIG. 3 is a diagram illustrating a state in which a detected face image is subjected to contraction, shifting, and rotational conversion so as to be normalized to be a face image necessary for face recognition.

That is to say, the image conversion section 141 performs fitting processing in which the face image in the SRAM1 is subjected to image conversion (normalization), such as contraction, shift, rotation conversion, etc., such that the positions of the right eye and the left eye match fixed coordinates in the SRAM2 from the both-eye position information in order to create a face image necessary for face recognition in the SRAM2. That is to say, as shown in FIG. 3, the normalization processing by the image conversion of the face image in the SRAM1 is performed, and the result is stored in the SRAM2.

In this regard, an apparatus of the present invention performs image conversion (normalization) processing with the suppression of the occurrence of an error in the positions and the shapes of face parts which become important at the time of face identification processing, such as eyes, a nose, a mouth, etc. A detailed description will be given of this processing later.

In the Gabor-filter application section 142, a Gabor filter is applied to the face image normalized by the image conversion section 141.

Figure 4A:
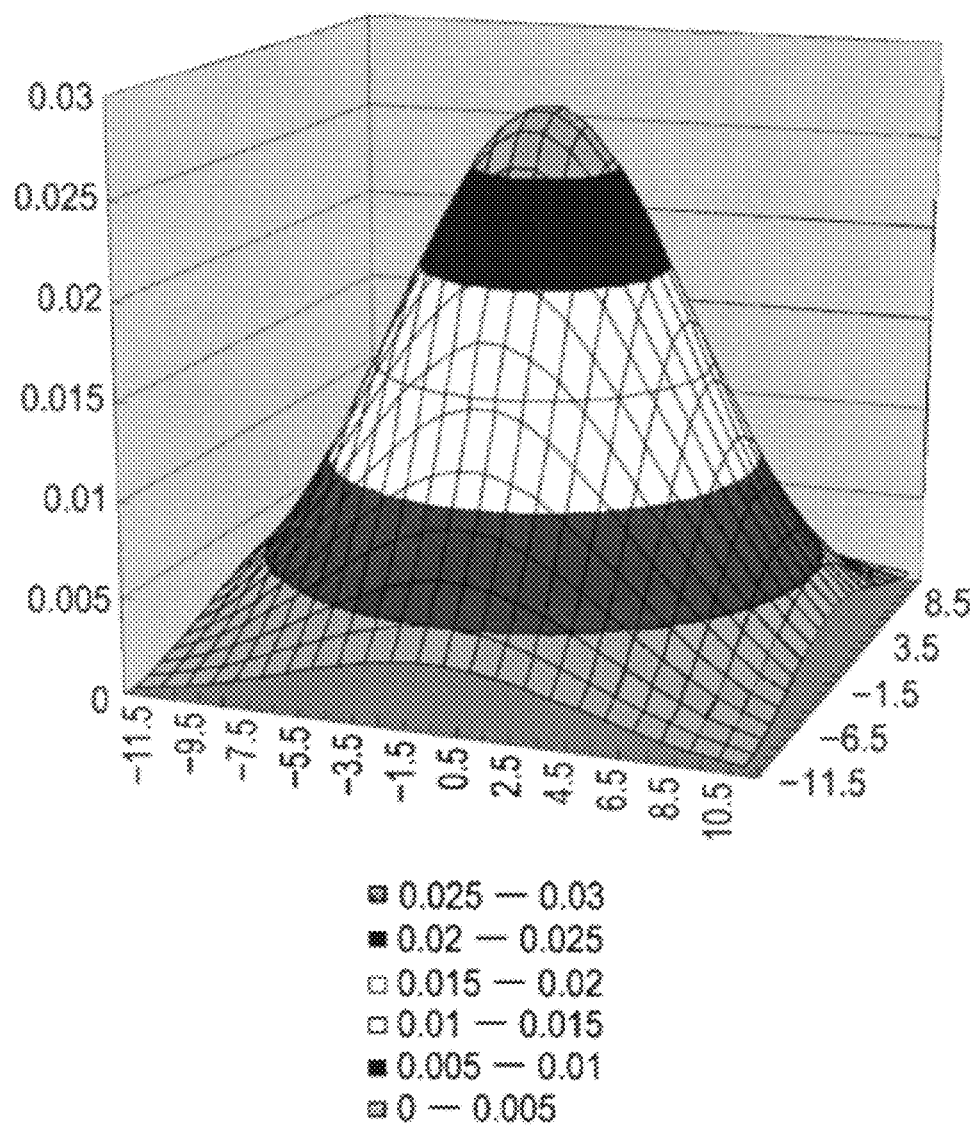
FIG. 4A is a diagram illustrating a filter window formed by a Gaussian function including fixed 24×24 pixels.
Figure 4B:
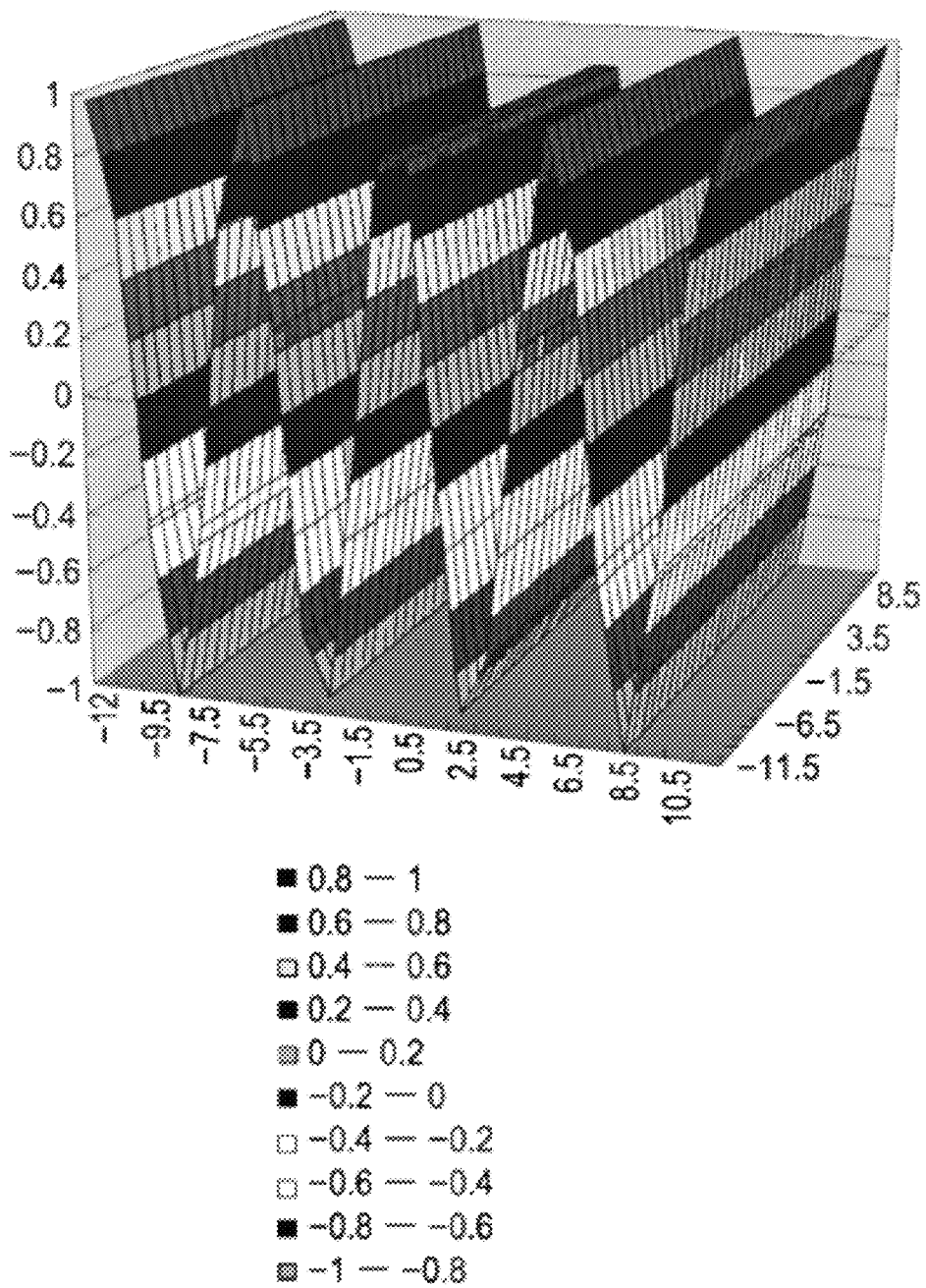
FIG. 4B is a diagram illustrating a response function including a sine function or the cosine function.
Figure 4C:
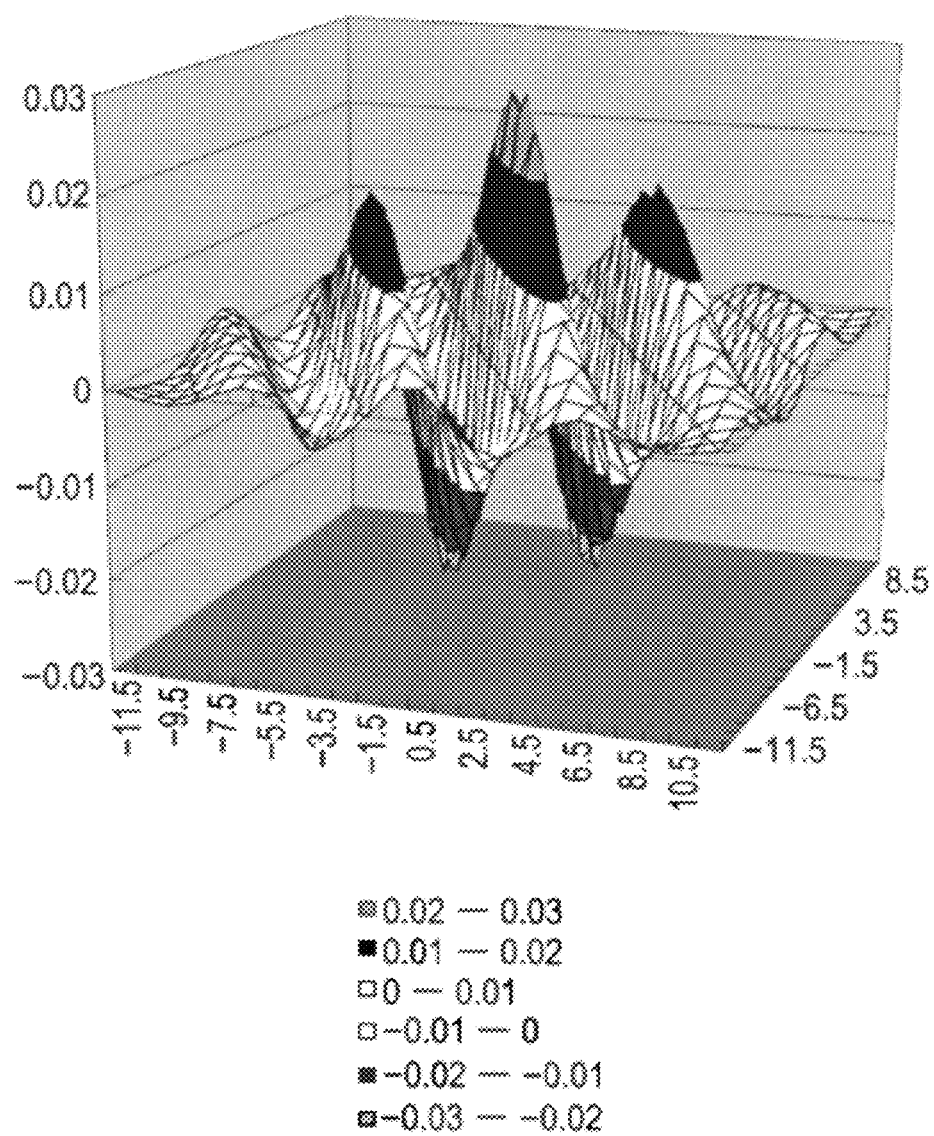
FIG. 4C illustrates a Gabor filter obtained by applying the filter window shown in FIG. 4A on the response function shown in FIG. 4B.
Figure 4D:
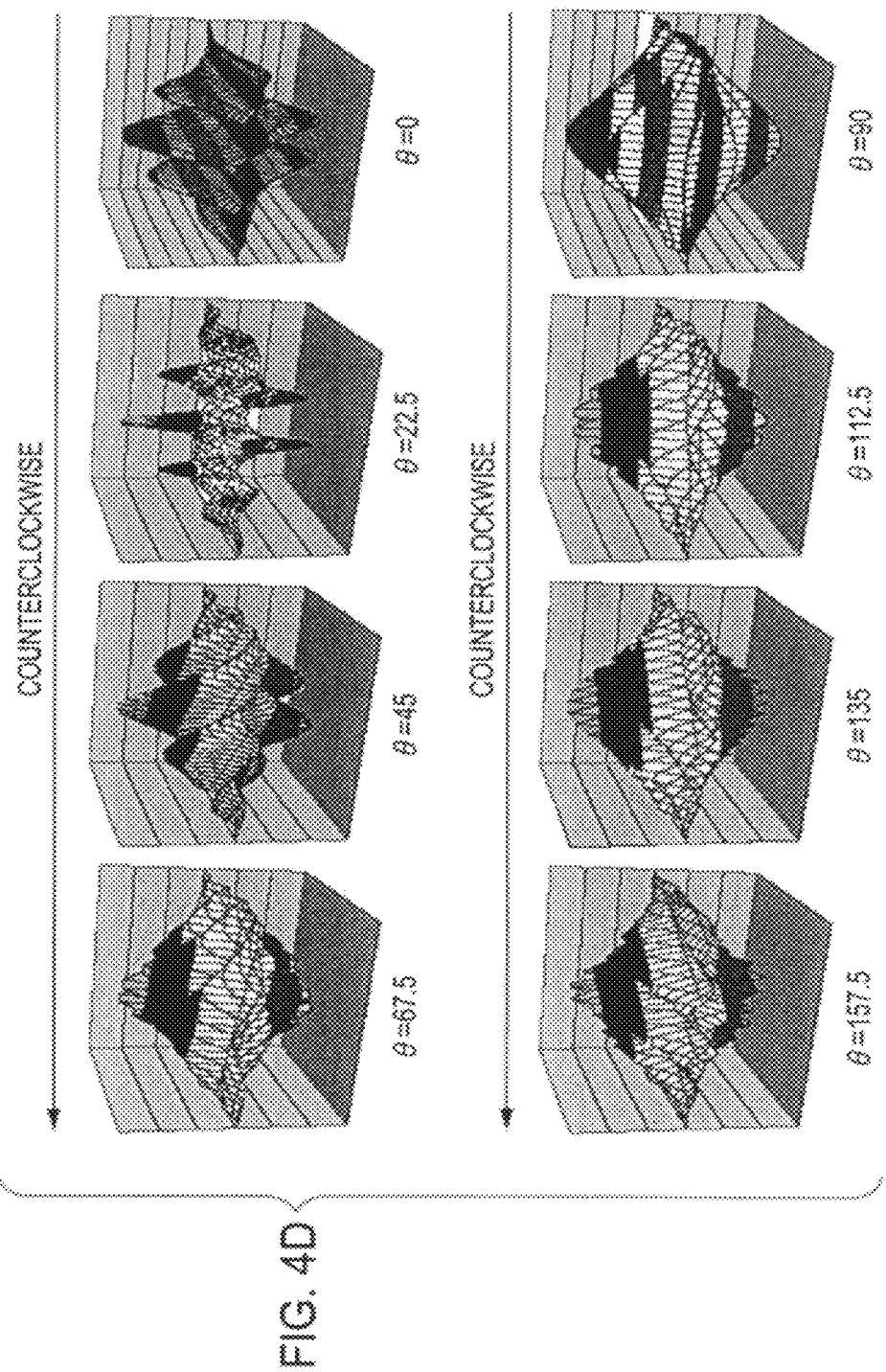
FIG. 4D illustrates eight Gabor filters obtained by applying filter windows on response functions in eight directions having 22.5-degree variations, individually.
Figure 4E:
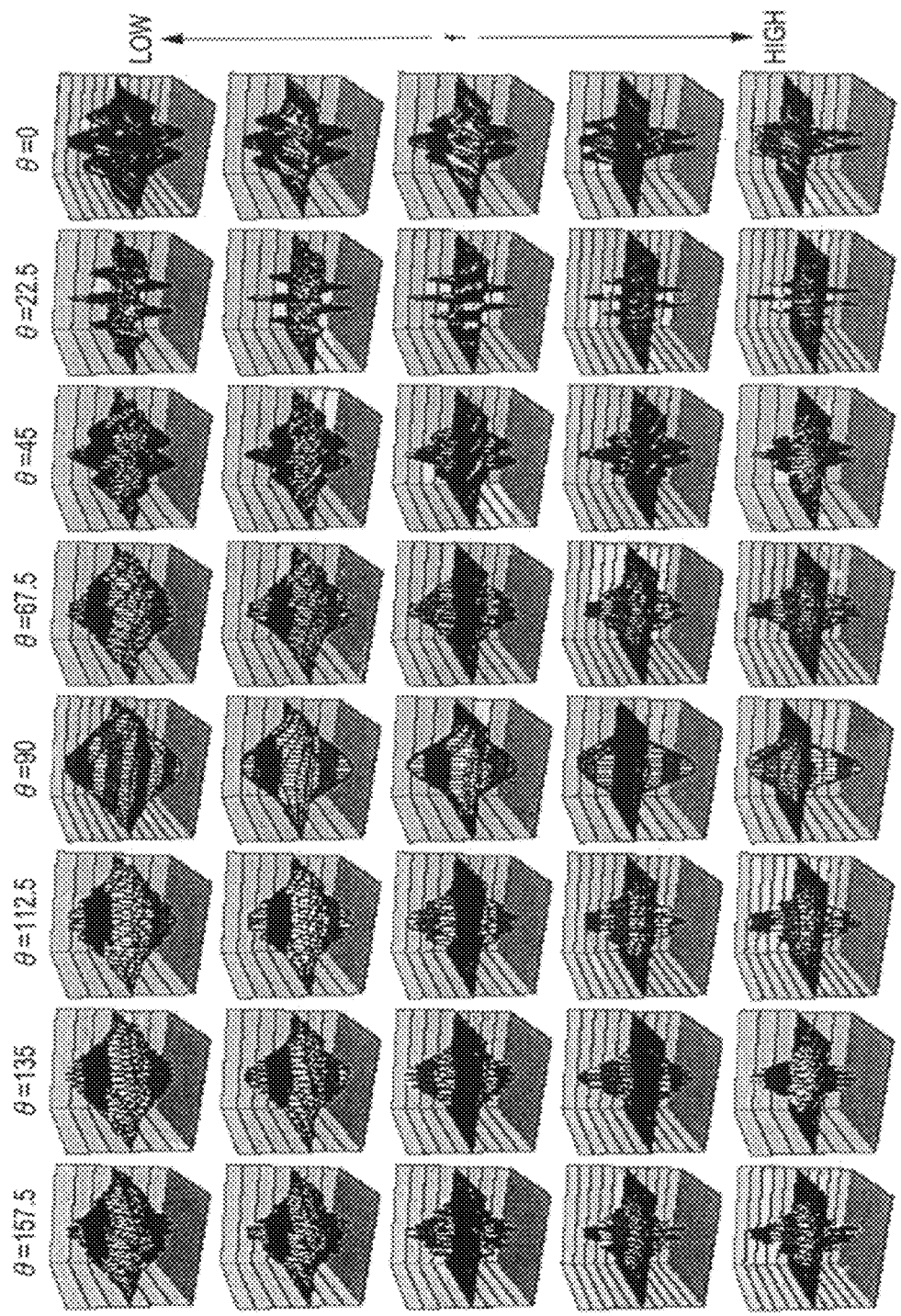
FIG. 4E illustrates 40 types of Gabor filter obtained similarly by applying filter windows with the angle θ in eight directions on response functions of five types of frequency f.

A Gabor filter is spatially expressed by a Gabor function using a Gaussian function for a window and a sine function or a cosine function as a basis for a frequency response. In the present embodiment, the filter window is fixed to 24×24 as shown in FIG. 4A. When the filter window is applied to a response function including a sine function and a cosine function having a specific frequency component as shown in FIG. 4B, it is possible to create a Gabor filter as shown in FIG. 4C. Also, when applying the filter window to response functions including sine functions or cosine functions in eight directions in increments of 22.5°, for example 0°, 22.5°, 45°, 67.5°, 90°, 112.5°, 135°, and 157.5°, it is possible to create 8 Gabor filters as shown in FIG. 4D. Furthermore, by applying the filter window with an angle θ in eight directions in the same manner, 40 types of Gabor filter in total are constituted as shown in FIG. 4E. The Gabor filter (Gabor kernel K(x, y)) is represented by the following operational expressions.

Expression 1

$$K(x, y) = \frac{f}{2\pi} \exp\left(-\frac{f^2}{2}(x^2 + y^2)(\sin 2\theta + \cos 2\theta)\right)$$

$$\left\{\exp(i 2\pi f(x\sin\theta + y\sin\theta)) - \exp\left(-\frac{1}{2f^2}\right)\right\}$$

$$gauss(x, y) = \frac{f}{2\pi} \exp\left(-\frac{f^2}{2}(x^2 + y^2)\right)$$

$$\mathrm{Re}(x, y) = \cos(2\pi f(x\cos\theta + y\sin\theta))$$

$$\mathrm{im}(x, y) = \sin(2\pi f(x\cos\theta + y\sin\theta))$$

The operation of a Gabor filter is the convolution of a pixel I (x, y) to which a Gabor filter Gi (x, y) is applied and the coefficients of the Gabor filter. The coefficients of a Gabor filter can be separated into the real part Re (x, y) having a cosine function as a frequency response, and the imaginary part Im (x, y) having a sine function as a frequency response. The convolution is applied to each of the above, and individual components are combined into a Gabor filter result Ji (x, y) including one scalar value. Note that (x, y) represents the pixel position of the feature-quantity extraction position, and i represents i-th of the 40 Gabor filters described above.

$$J_i(x,y)=G_i(x,y) \otimes I(x,y)$$ Expression 2

By applying maximum 40 types of Gabor filter to the feature-quantity extraction position (x, y) of an image to obtain a maximum 40 scalar-value tuple $\{J1, J2, \ldots, J40\}$, which is called a Gabor jet.

The similarity calculation section 143 performs a normalized correlation operation between the Gabor jet GS calculated on the input image and the Gabor jet GR calculated on a registered image to obtain the similarity d for each feature-quantity extraction position.

$$d = \frac{GS \cdot GR}{|GS||GR|}$$ Expression 3

Figure 5:
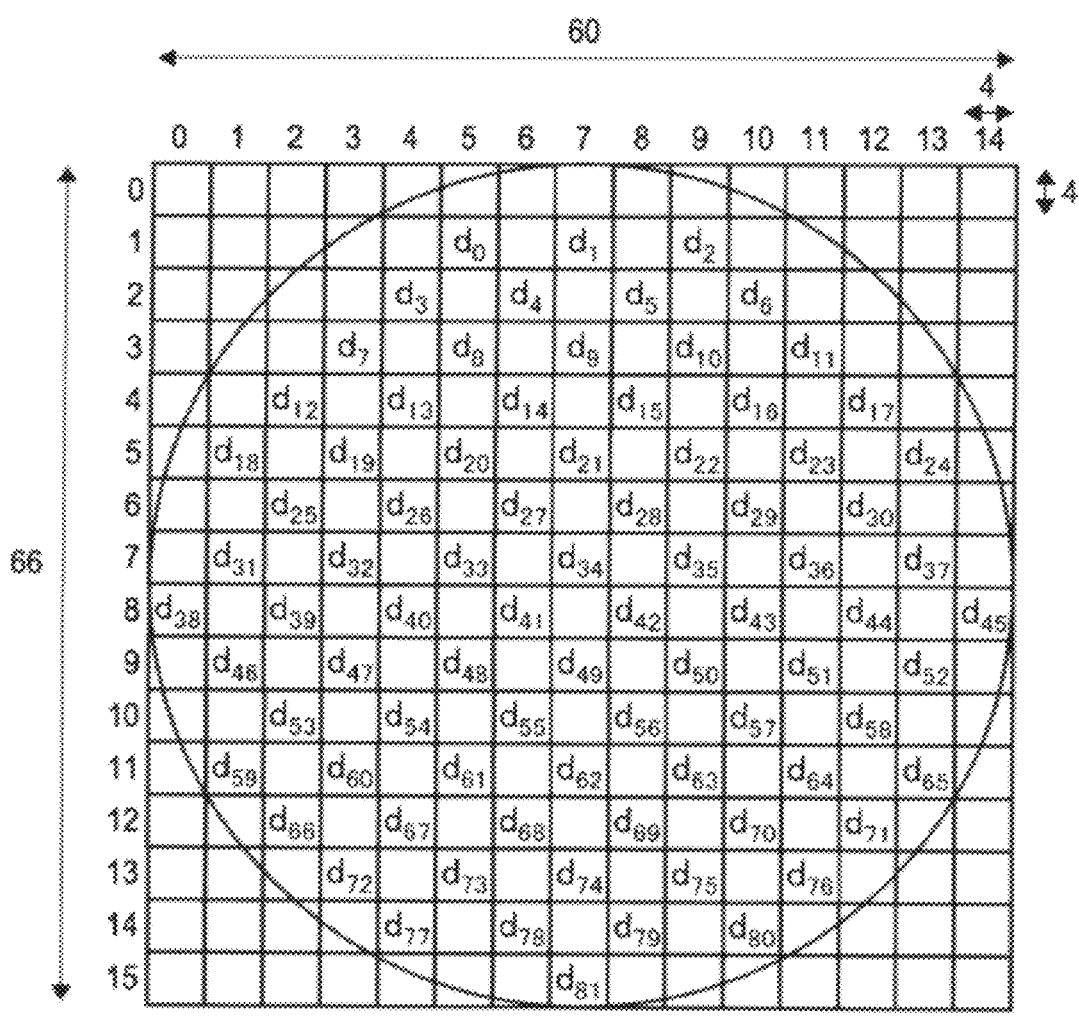
FIG. 5 is a diagram illustrating 82 places of feature-quantity extraction position disposed on a normalized face image having 60×66 pixels.

In this embodiment, out of the face image of normalized 60×66 pixels, a normalized correlation operation is performed on the feature-quantity extraction positions of 82 places (refer to FIG. 5), which are easy to extract feature quantities to obtain similarities. As a result, a similarity vector D having elements of the normalized correlation operation result obtained at each feature-quantity extraction position of 82 places d0, d1, . . . , and d81 is obtained.

$$D=(d_0,d_1,d_2,\ldots,d_{81})$$ Expression 4

In this regard, in the above, a description has been given that "maximum 40 types" of Gabor filter are applied. This means that it is not necessary to apply Gabor filters of all 40 types at all the feature-quantity extraction positions of 82 places. How many types of Gabor filters should be applied depends on a place of the feature-quantity extraction position to be extracted similarities, and the type of and the number of (the number of elements of the Gabor jet) Gabor filter are different depending on the place.

The matching determination section 144 determines the matching of both of the images on the basis of the similarity vector between the input image and a registered image. The present embodiment uses gentleboost as the operation of the identification device. Here, gentleboost is calculated using the following operational expressions. Note that a, q, and b in the expressions are registered as a dictionary in advance.

$$y000=a000\times(dj000>q000)+b000$$

$$y001=a001\times(dj001>q001)+b001$$

$$y002=a002\times(dj002>q002)+b002$$

$$y159=a159\times(dj159>q159)+b159$$

$$0 \leq j000, j001, j002, \ldots, j159 \leq 81$$ Expression 5

Then, a determination is made on whether the input image matches the registered image in accordance with the following discriminant.

If $((y000+y001+y002+\ldots+y159)>\text{threshold})$ face OK
else face NG  Expression 6

In this regard, in this embodiment, gentleboost is used for determination of matching. However, for example, the boundary surface value of a similarity vector may be class determined using a support vector machine, and the matching of the face images may be determined.

Next, a detailed description will be given of image conversion processing performed by the image conversion section 141 (refer to FIG. 2) in the face identification device 14 shown in FIG. 1. As already described with reference to FIG. 3, the image conversion section 141 performs fitting processing in which the face image in the SRAM1 is subjected to image conversion (normalization), such as contraction, shifting, rotation conversion, etc., such that the positions of the right eye and the left eye match fixed coordinates in the SRAM2 from the both-eye position information of the face image picked up from face images stored in the SRAM1 in order to create a face image necessary for face recognition in the SRAM2. An apparatus of the present invention performs image conversion (normalization) processing with the suppression of the occurrence of an error in the positions and the shapes of face parts which become important at the time of face identification processing, such as eyes, a nose, a mouth, etc. In the following, a detailed description will be given of the image conversion processing.

First, the image conversion section 141 in the face identification device 14 performs write processing of a face area portion of an image in the SDRAM 15 (refer to FIG. 1) into the SRAM1 (refer to FIG. 2). The image conversion section 141 picks up a face image area from the images written in the SRAM1 (refer to FIG. 2), performs image conversion as fitting processing, and writes the processing result into the SRAM2. The fitting processing is the processing which normalizes an image in the SRAM1 to create the image in the SRAM2. The normalization in the present apparatus means the image conversion processing including at least any one of the positioning, the rotation, the expansion or the contraction a face image.

Figure 6:
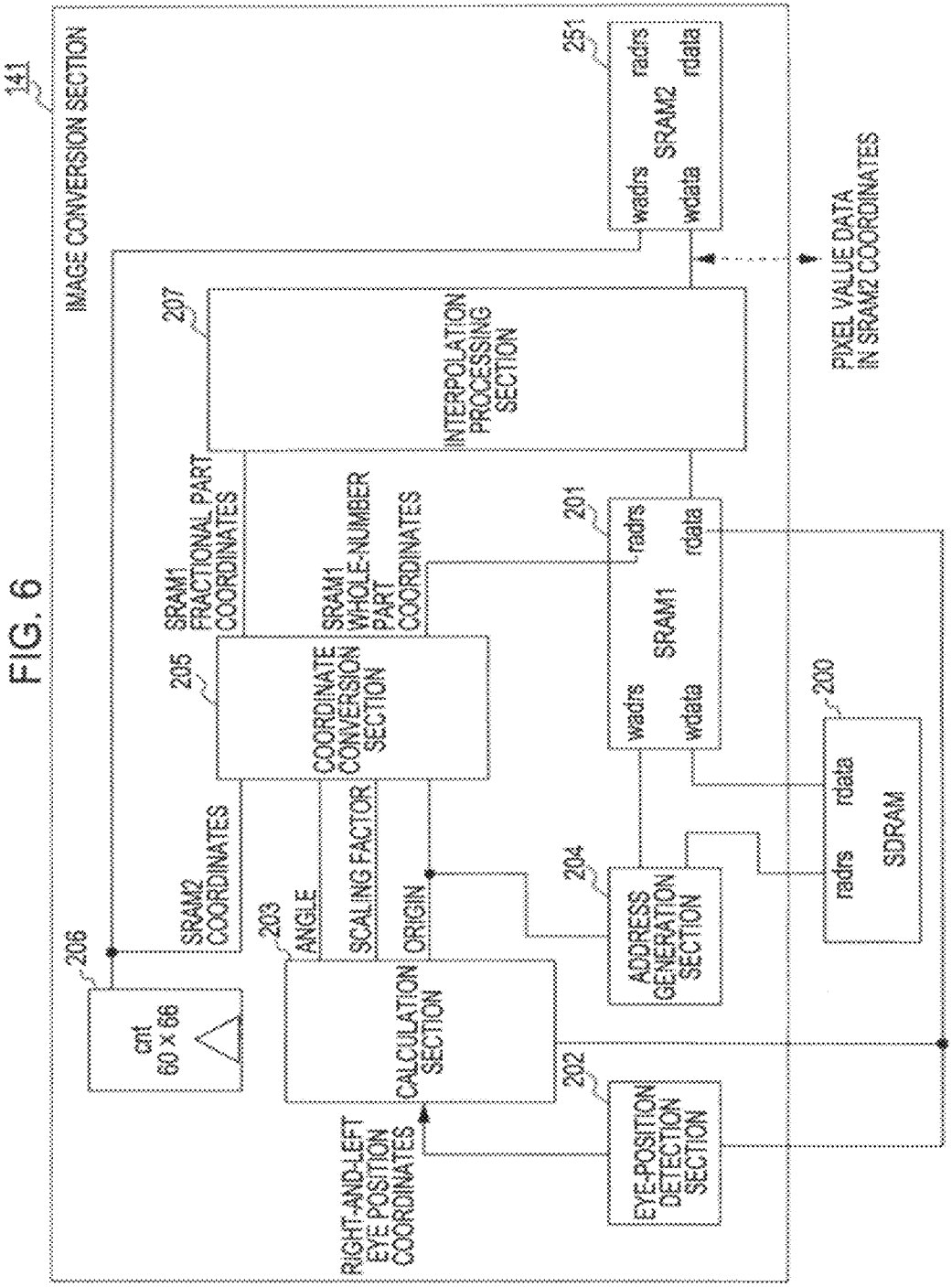
FIG. 6 is a diagram illustrating details of image conversion processing performed by an image conversion section 141.

With reference to FIG. 6, a detailed description will be given of the image conversion processing to be performed by the image conversion section 141. FIG. 6 illustrates a detailed configuration of the image conversion section 141. First, a calculation section 203 in the image conversion section 141 reads a face image written from an SDRAM 200 in the SRAM1 201, and receives the input of the coordinates of the right and left eye positions of the face image written from the eye-position detection section 202 into the SRAM1 201.

Figure 7:
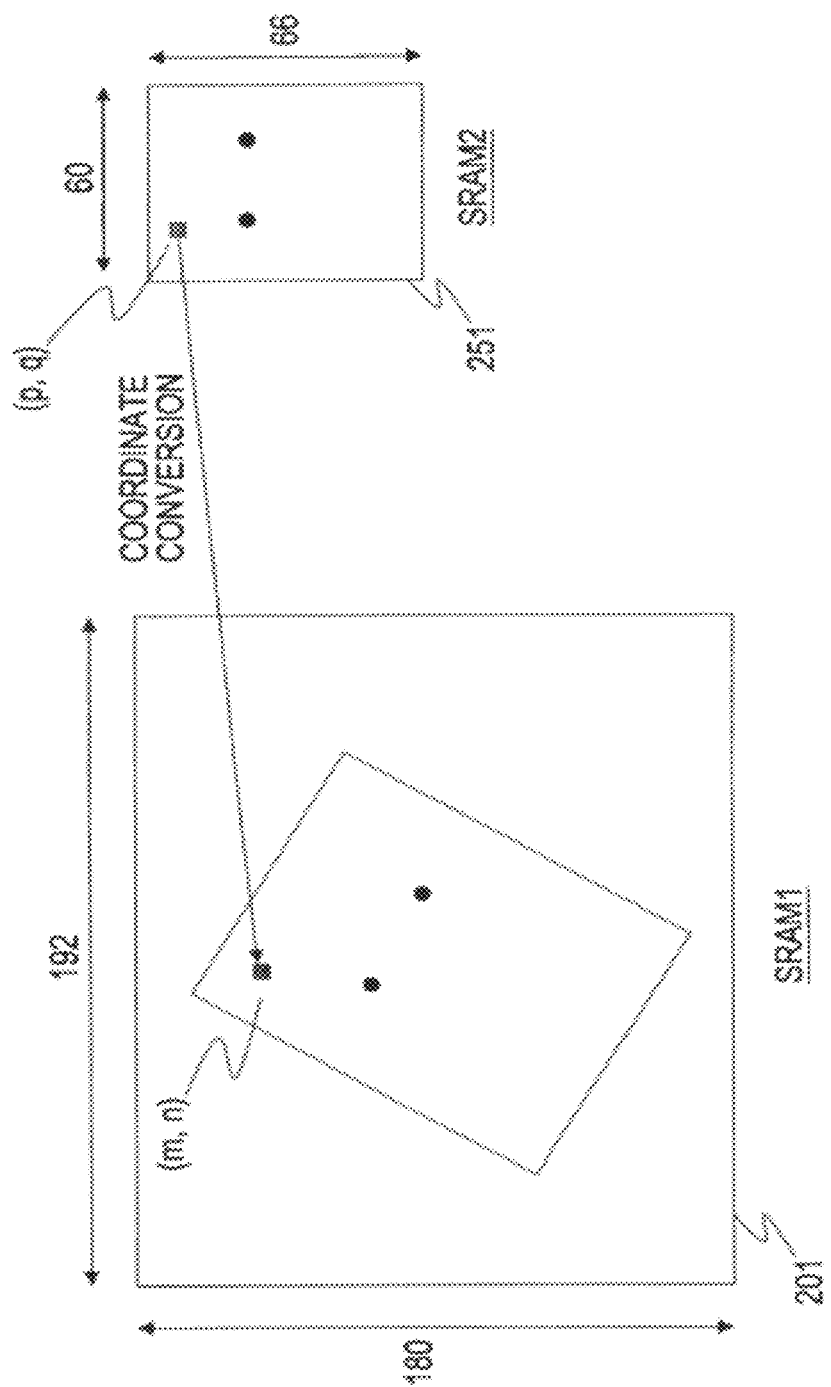
FIG. 7 is a diagram illustrating processing for obtaining pixel positions of SRAM1 corresponding to pixel positions of SRAM2.

The calculation section 203 obtains the rotational angle, the scaling factor, and the origin position of a face image to be subjected to image conversion as the fitting processing on the basis of the coordinate data. Furthermore, a coordinate conversion section 205 obtains the information of which position in the SRAM1 201 each pixel in the SRAM2 251 corresponds to with decimal precision from the obtained angle, scaling factor, and origin. For example, from a pixel (p, q) in the SRAM2 251 shown in FIG. 7, the pixel position (m, n) in the memory, the SRAM1 201, is calculated. For example, assuming that the SRAM2 251 shown in FIG. 7 is a memory storing 60×66 pixel information, the pixel position (m, n) corresponding to each pixel position included in the face area of the 60×66 pixels in the memory, SRAM1 201 is calculated. In this case, m or n in the pixel position (m, n) in the memory SRAM1 201, may not be an integer. The calculation section calculates the corresponding pixel position (m, n) not only with a whole number part, but, for example with a precision of two decimal places.

An interpolation processing section 207 shown in FIG. 6 determines a pixel value of each pixel of the SRAM2 251 on the basis of the corresponding pixel-position information calculated by the coordinate conversion section 205. That is to say, when the pixel position (m, n) in the memory SRAM1 201, corresponding to the pixel (p, q) in the SRAM2 251 has integers m and n in the corresponding pixel position information calculated by the coordinate conversion section 205, the pixel value of the pixel (p, q) of the SRAM2 251 is set as the pixel value of the pixel position (m, n) in the memory SRAM1 201. However, when m and n in the corresponding pixel position (m, n) are not integers, and have fractional parts, the pixel value of the pixel (p, q) in the SRAM2 251 is determined by interpolation processing based on the pixel value of the SRAM1 pixels surrounding the corresponding pixel position (m, n).

Figure 8B:
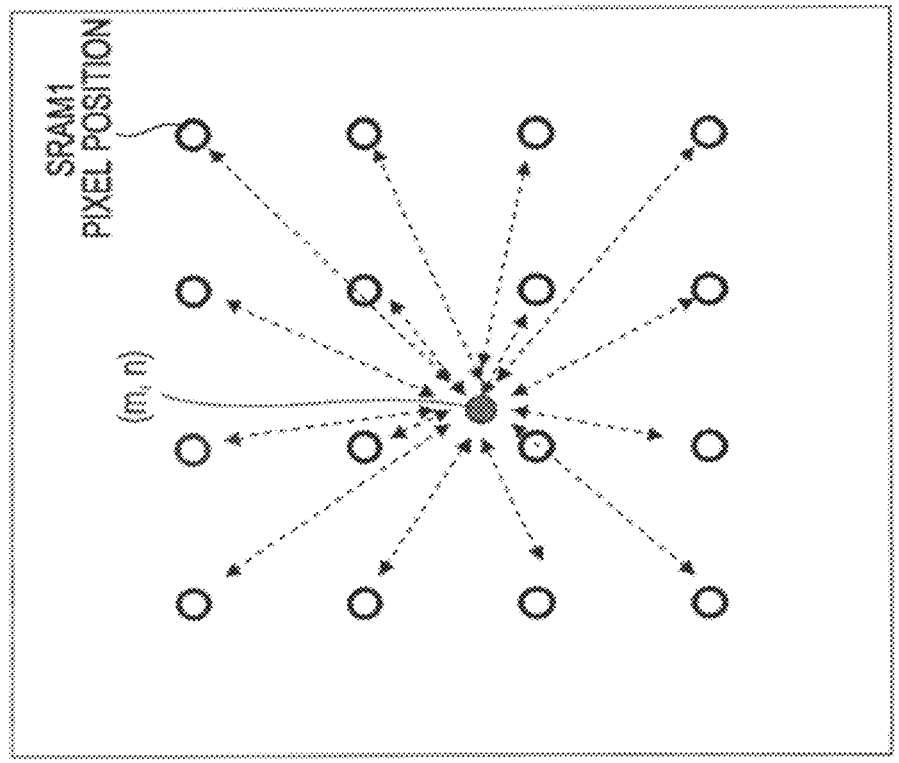
FIGS. 8A and 8B are diagrams illustrating pixel interpolation processing performed by an interpolation processing section 207 of the image conversion section 141.
Figure 8A:
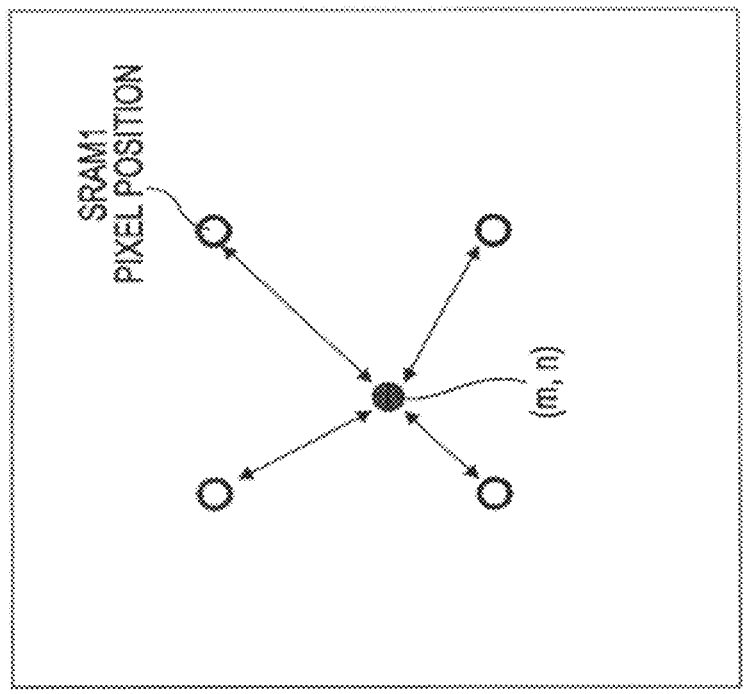

With reference to FIGS. 8A and 8B, a description will be given of pixel interpolation processing performed by the interpolation processing section 207 in the image conversion section 141 shown in FIG. 6. When the interpolation processing performed by the interpolation processing section 207 uses a bi-linear method, as shown in FIG. 8A, the surrounding four pixels (the coordinates of the whole number parts of SRAM1 201) of the corresponding pixel position (m, n) in the SRAM1 201 and the distances to the surrounding four pixels (the coordinates of the fractional parts of SRAM1) are obtained. Also, when the interpolation processing performed by the interpolation processing section 207 uses a bi-cubic method, as shown in FIG. 8B, the surrounding 16 pixels (the coordinates of the whole number parts of SRAM1 201) of the corresponding pixel position (m, n) in the SRAM1 201 and the distances to the surrounding 16 pixels (the coordinates of the decimal parts of SRAM1) are obtained.

Next, a weight is calculated as a contribution rate of each pixel value using the pixel of the whole-number part coordinates in the obtained SRAM1 201 and the fractional-part coordinate data in the SRAM1 201, and the pixel value of the corresponding pixel (p, q) in the SRAM2 251 is calculated on the basis of the calculated weight in order to calculate the pixel value to be recorded (written) into the SRAM2.

In this manner, the pixel value of the image to be stored in the SRAM2 251 is determined on the basis of each constituent pixel value of the image stored in the SRAM1 201. In this regard, as described before, the calculation section 203 in the image conversion section 141, first reads the face image written from the SDRAM 200 into the SRAM1 201, furthermore receives the input of the coordinates of the right and left eye positions of the face image written from the eye-position detection section 202 into the SRAM1 201. On the basis of this coordinate data, the calculation section 203 obtains the rotational angle, the scaling factor, and the origin position of the face image to be used for image conversion as the fitting processing. Further, the calculation section 203 obtains which position in the SRAM1 201 each position of the SRAM2 251 corresponds to from the obtained angle, scaling factor, and origin with decimal precision.

The fitting processing is image conversion processing to be performed as normalization processing for performing the matching processing with a registered image. A description will be given of the normalization processing (image conversion processing) below. The calculation section 203 defines the coordinates of the SRAM2 251 for storing the normalized face image first.

In the normalization processing in accordance with the present embodiment, first, a determination is made of the coordinates of the right and left eye positions in the SRAM2 251 storing the normalized face image. That is to say, a determination is made of the fixed coordinates of the right and left eye positions in the SRAM2 251. Specifically, for example the fixed coordinates in the SRAM2 251 are assigned by the following processing.

Figure 9:
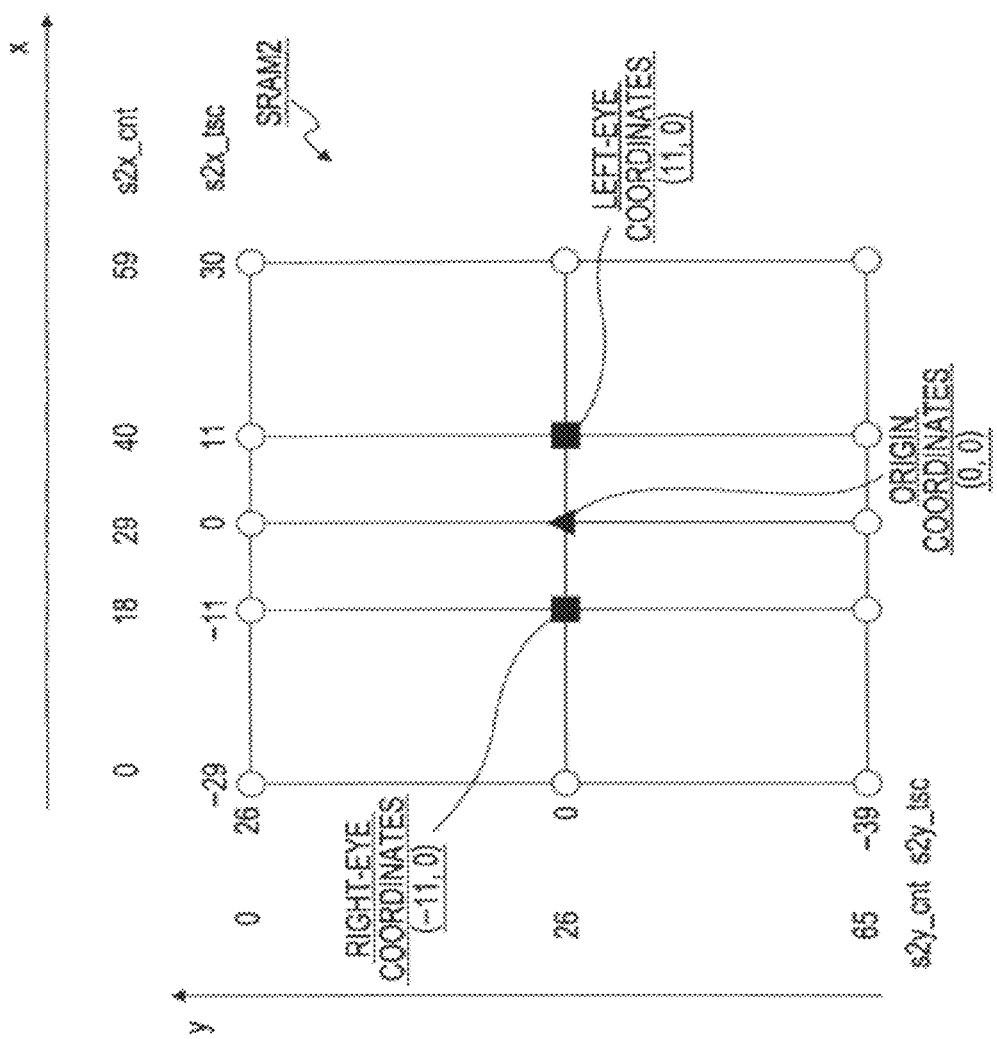
FIG. 9 is a diagram illustrating a configuration of pixels in a face-image storage area of SRAM2, 251 for storing a face image after normalization (after image conversion processing)

A description will be given of an example of the processing when, as shown in FIG. 9, it is assumed that the pixel coordinates of the face-image storage area of the SRAM2 251 for storing the face image after the normalization processing (image conversion processing) is (x, y), and lateral axis (X-axis): size 60 pixels, x=−29 to +30 and vertical axis (Y-axis): size 66 pixels, x=−39 to +26.

In the coordinates of face-image storage area of the SRAM2 251 like this, the coordinates of the right-eye position (x, y) is assigned to (−11, 0), and the coordinates of the left-eye position (x, y) is assigned to (11, 0). Also, the coordinates (x, y) of the origin is assigned to the center (0, 0) of the right-eye position and the left-eye position.

Next, the coordinates of the SRAM1 201 in which a face image before the normalization is stored. The face-image data stored in the SRAM1 201 corresponds to the face image stored in the SDRAM 200 shown in FIG. 6, so that the coordinates in the SDRAM 200 is considered first. The eye-position detector 202 shown in FIG. 6 obtains the right and the left eye position information in the SDRAM 200, and this information is input to the calculation section 203. In this regard, the detected right and left eye positions does not necessarily correspond to a specific pixel in the SDRAM. Furthermore, the center between the right and left eye positions does not necessarily correspond to a specific pixel in the SDRAM.

That is to say, the coordinates of the origin (the center of the right and left eyes) in the SDRAM corresponding to the center of right and left eyes, which is the origin to be set in the SRAM2 251 storing the face image after the normalization does no necessarily correspond to a specific pixel position in the SDRAM.

Assume that the coordinates of the origin (the center of the right and left eyes) in the SDRAM is (org_$drx$,org_$dry$).

The coordinates (org_$drx$, org_$dry$) of the origin (the center of the right and left eyes) in the SDRAM 200 exist in the following range with respect to a pixel (x, y) in the SDRAM 200.

$X <= \text{org\_}drx < x+1$ $y <= \text{org\_}dry < y+1$

When a pixel in the SDRAM 200 is cut out and is stored (written) into the SRAM1 201, a pixel (x, y) in the SDRAM 200 is matched to the origin (0, 0) of the SDRAM 200.

Figure 10:
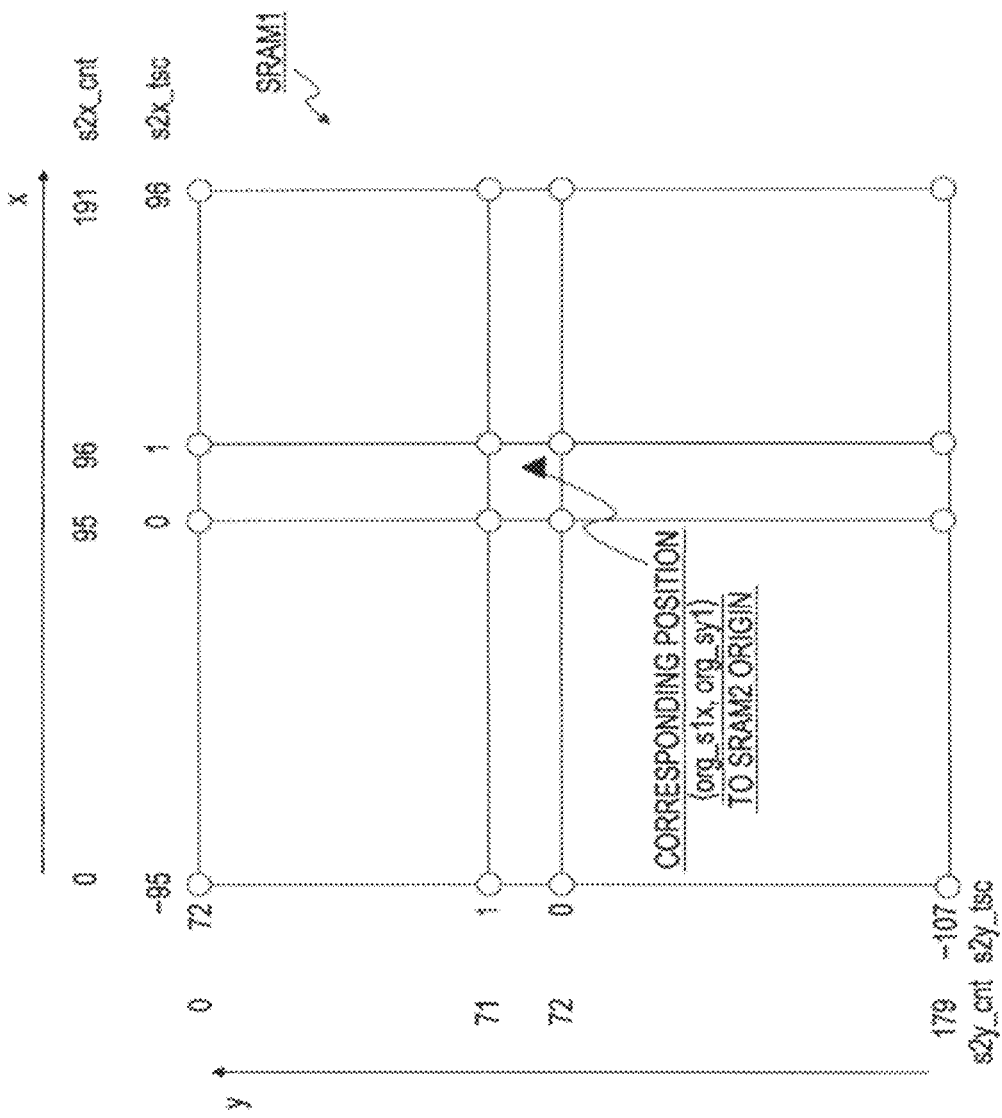
FIG. 10 is a diagram illustrating a configuration of pixels in a face-image storage area of SRAM2, 251 for storing a face image before normalization (image conversion processing)

As shown in FIG. 10, it is assumed that the pixel coordinates of the face-image storage area of the SRAM1 201 for storing the face image before the normalization processing (image conversion processing) is (x, y), and lateral axis (X-axis): size 192 pixels, x=−95 to +96 and vertical axis (Y-axis): size 180 pixels, x=−107 to +72.

With this setting, as shown in FIG. 10, the origin position (org_s1x, org_s1y) in the SRAM1 201 corresponding to the coordinates (org_$drx$, org_$dry$) of the origin (the center of the right and left eyes) in the SDRAM 200 exists in the following range.

$0 <= \text{org\_}s1x < 1$ $0 <= \text{org\_}s1y < 1$

Figure 11:
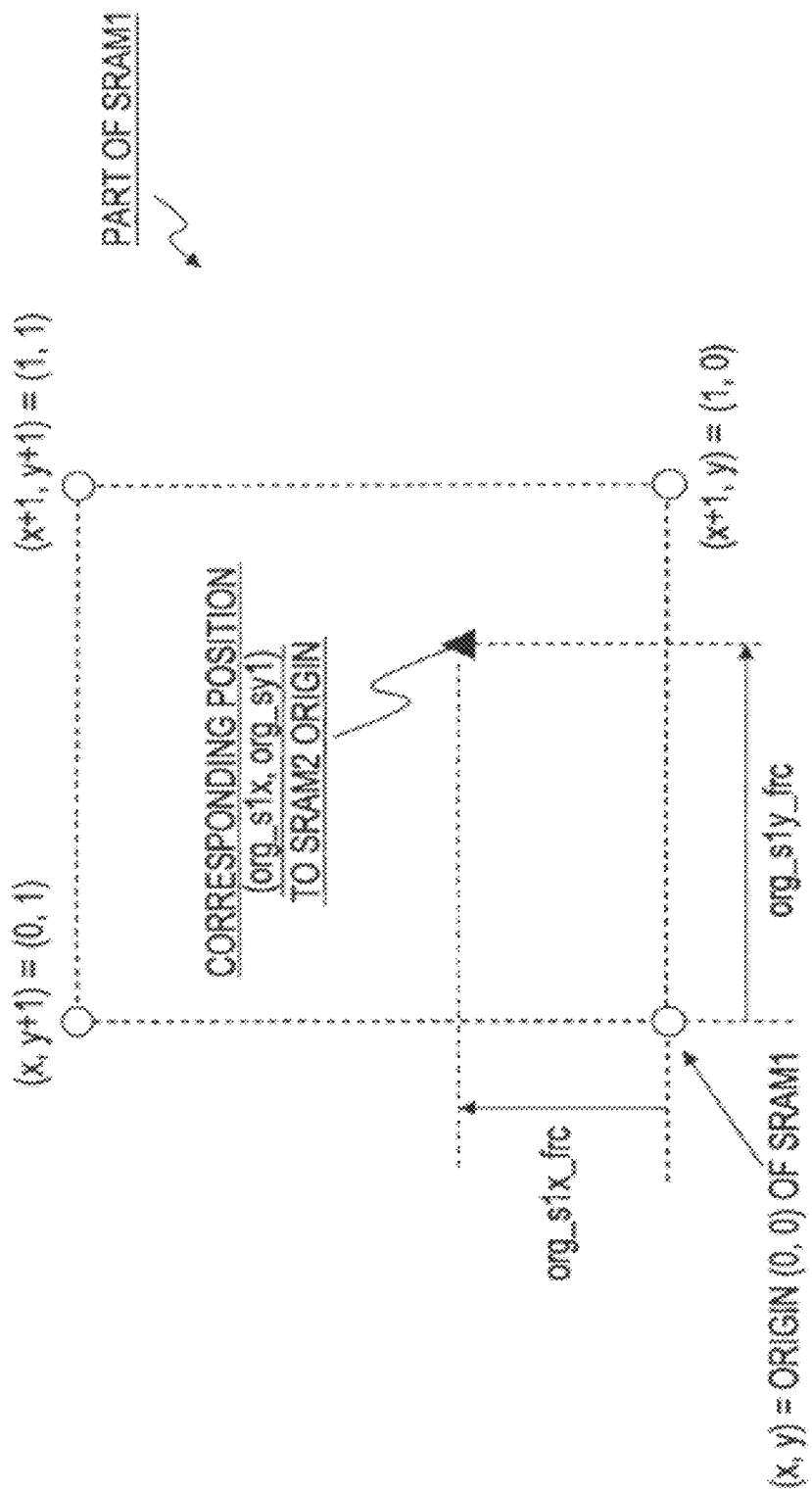
FIG. 11 is an enlarged diagram of a vicinity area of an origin of the SRAM1 201 shown in FIG. 10.

FIG. 11 is an enlarged diagram of a vicinity of an origin area of the SRAM1 201 shown in FIG. 10. The mark "▲" shown in the diagram corresponding to the origin of the SRAM 2 is the position in the coordinate system in the SRAM1 as follows.

$$0<=org\_s1x<1$$

$$0<=org\_s1y<1.$$

Here, assuming that org_s1x_int: the whole number part of the origin coordinate x of SRAM1, org_s1x_frc: the fractional part of the origin coordinate x of SRAM1, org_s1y_int: the whole number part of the origin coordinate y of SRAM1, and org_s1y_frc: the fractional part of the origin coordinate y of SRAM1, then org_s1x_int=0, and org_s1y_int=0.

In this manner, the origin of the SRAM2 251 into which the image after the normalization (image conversion processing) is stored is the origin coordinates (0, 0) of the SRAM2 coordinate system. However, as described with reference to FIGS. 10 and 11, the coordinate position of the SRAM2 coordinate system, corresponding to the origin of the SRAM1 201 storing the image before normalization (image conversion processing), does not become (0, 0), but becomes (org_s1x, org_s1y) on the condition as follows.

$$0<=org\_s1x<1$$

$$0<=org\_s1y<1$$

Accordingly, when a face image stored in the SRAM1 201 is subjected to the normalization (image conversion), and is stored into the SRAM2 251, it becomes necessary to perform processing for obtaining which point in the coordinate system of the SRAM1 201 individual coordinates of the SRAM2 251 correspond to.

That is to say, when at least any one of the image contraction processing, the image rotation processing, or the image translation processing is performed as the normalization processing (image conversion) on the face image recorded in the SRAM1 201 to store the image after the normalization into the SRAM2 251, it becomes necessary to perform processing for obtaining which point in the coordinate system of the SRAM1 201 individual coordinates of the SRAM2 251 correspond to. In the calculation section 203 of the image conversion section 141 shown in FIG. 6, the rotational angle, the conversion scaling factor, and the origin information as the image conversion parameters, which become necessary for obtaining the correspondence are obtained, and these conversion parameters are output to the coordinate conversion section 205.

The coordinate conversion section 205 calculates the coordinates of the SRAM1 201 corresponding to individual coordinates to the SRAM2 251 by applying these conversion parameters input from the calculation section 203. In this regard, in this processing, the coordinate conversion section 205 receives the addresses corresponding to the pixel positions of a face-image storage area in the SDRAM 200 and the SRAM1 201 from an address generation section 204 of the image conversion section 141 shown in FIG. 6, and calculates the corresponding pixel positions. This calculation result is output to the interpolation processing section 207, and the interpolation processing section 207 performs pixel-value interpolation processing to which the bi-linear method described with reference to FIGS. 8A and 8B before or a bi-cubic method is applied in order to determine the pixel values, and writes the determined pixel values into individual coordinate positions of the SRAM2 251.

Figure 12:
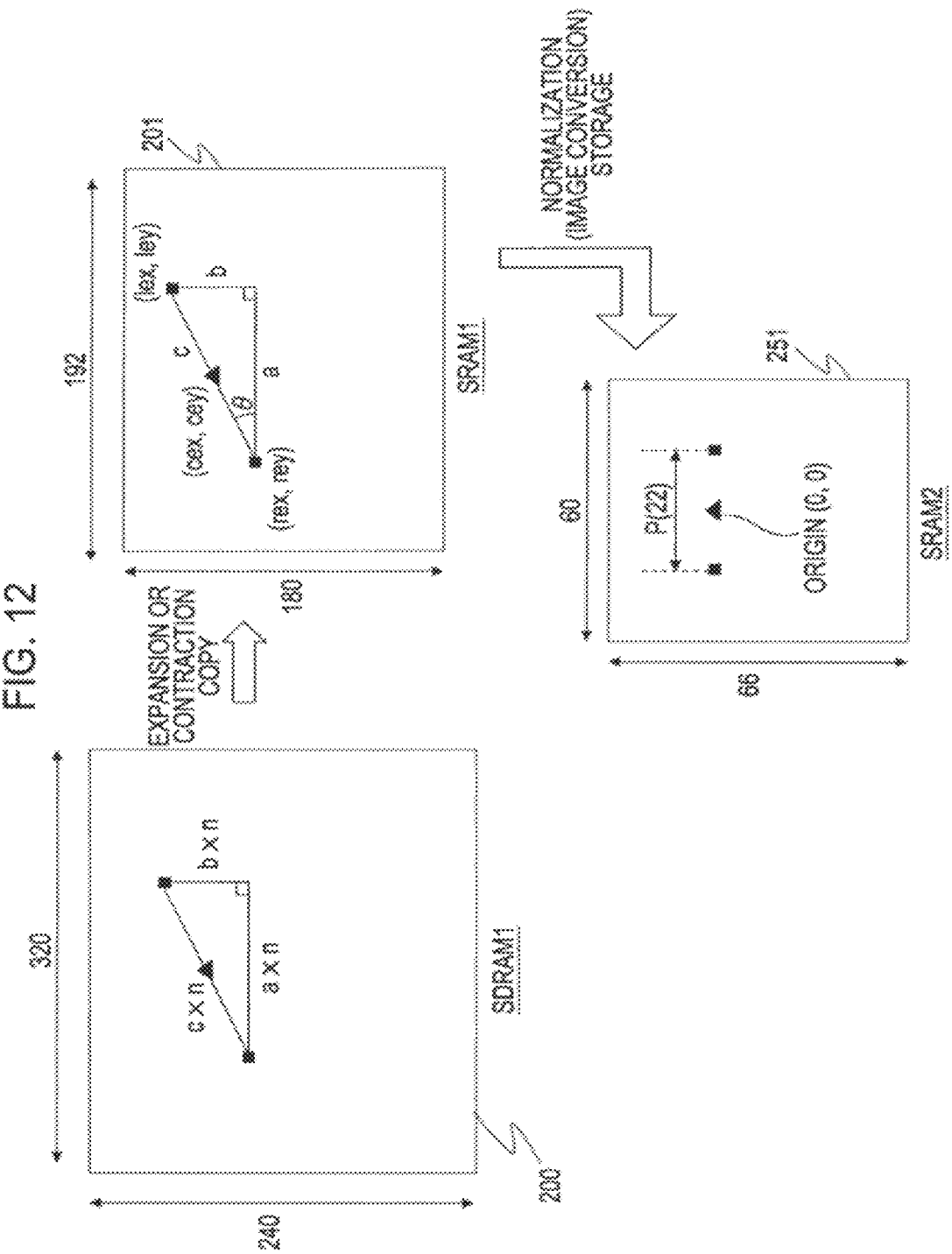
FIG. 12 is a diagram illustrating corresponding pixel calculation processing necessary for normalization processing.

Referring to FIG. 12, a detailed description will be given of corresponding-pixel calculation processing necessary for the normalization processing, that is to say, the processing for obtaining which point in the coordinate system of the SRAM1 201 individual coordinates of the SRAM2 251 correspond to. FIG. 12 shows the following memory areas: the SDRAM 200 in which an input image is stored, the SRAM1 201 in which a face-image area stored in the SDRAM 200 is cut out and stored, and the SRAM2 251 in which the face image stored in the SRAM1 201 is subjected to the normalization (image conversion) processing and the image after the normalization (conversion processing) is stored.

As shown in FIG. 12, the individual memory areas of the SDRAM 200, the SRAM1 201, and the SRAM2 251 are assumed to be as follows.

SDRAM: 320×240 pixels

SRAM1: 192×180 pixels

SRAM2: 60×66 pixels

Also, the origin of the face image stored in the SRAM2 251 after the normalization processing is assumed to be the origin (0, 0) in the SRAM2 coordinate system as the center position of the right and left eyes of the face image stored in the SRAM2 251. The distance between the right eye and the left eye of the face image stored in the SRAM2 251 is assumed to be [P], for example 22 pixels.

As shown in FIG. 12, it is assumed that the coordinates of the left eye and the right eye, and the coordinates of the origin, which is the center of the right and left eyes of the face image in the SRAM1 201 storing an image before the normalization are as follows.

left eye coordinates: (lex, ley), right eye coordinates: (rex, rey), origin coordinates: (cex, cey).

Also, it is assumed that the distance between the left eye coordinates (lex, ley) and the right eye coordinates (rex, rey) is [c], the difference in x-coordinate between the left eye coordinates (lex, ley) and the right eye coordinates (rex, rey) is [a], and the difference in y-coordinate between the left eye coordinates (lex, ley) and the right eye coordinates (rex, rey) is [b].

Thus, a, b, and c corresponds to the lengths of sides of a right triangle, respectively, in the SRAM1 201 shown in FIG. 12, and have the following relationship:

$$c^2=a^2+b^2.$$

The angle formed by the sides a and c is assumed to be θ.

Here, the coordinates (x, y) in the coordinate system of the SRAM1 201, which is the memory storing an image before the normalization, and the coordinates (x, y) in the coordinate system of the SRAM2 251, which is the memory storing an image after the normalization are defined as follows.

s1x: x-coordinate in the SRAM1 coordinate system, s1y: y-coordinate in the SRAM1 coordinate system, s2x: x-coordinate in the SRAM2 coordinate system, and s2y: y-coordinate in the SRAM2 coordinate system.

The coordinate conversion section 205 calculates the coordinates (s1x, s1y) of the SRAM1 201, which is the memory storing an image before the normalization, on the basis of the following expression (Expression 1) for each of the coordinates (s2x, s2y) of the SRAM2, which is the memory storing an image after the normalization.

$$s1x = (c/P) \times ((s2x) \times \cos\theta + s2y \times \sin g\theta) + (org\_s1x\_frc) = (a \times s2x + b \times s2y)/P + (org\_s1x\_frc)$$

$$s1y = (c/P) \times ((-s2x) \times \sin\theta + s2y \times \cos\theta) + (org\_s1y\_frc) = (-b \times s2x + a \times s2y)/P + (org\_s1y\_frc) \quad \text{(Expression 1)}$$

In this regard, in the above-described expression (Expression 1), $$a = (lex) - (rex),$$

$$b = ley - rey,$$

$$c = \sqrt{(a \times a + b \times b)},$$

$$\cos\theta = a/c, \text{ and}$$

$$\sin g\theta = b/c.$$

The coordinate conversion section 205 calculates the coordinates (s1x, s1y) of the SRAM1 201, which is a memory storing an image before the normalization for each of the coordinates (s2x, s2y) of the SRAM2, which is the memory storing an image after the normalization using the above-described expression (Expression 1).

The calculation section 203 obtains the rotational angle, the conversion scaling factor, and the origin information as the image conversion parameters, and outputs these conversion parameters to the coordinate conversion section 205. In the above-described expression (Expression 1), the following parameters are used:

conversion scaling factor (image contraction processing parameter): (c/P), rotational angle (image rotation processing parameter): θ, origin information (image translation processing parameter): (org_s1x_frc, org_s1y_frc).

In this regard, the origin information (image translation processing parameter) is the information indicating the position corresponding to the origin of the SRAM2 in the SRAM1 coordinate system (refer to FIG. 11). The calculation section 203 obtains the above-described individual conversion parameters, namely, the rotational angle, the conversion scaling factor, and the origin information on the basis of the original information of the SRAM2 251 and the face image information stored in the SRAM1 201, and outputs these parameters to the coordinate conversion section 205.

The coordinate conversion section 205 receives input of the count value of each pixel (s2x, s2y) of the SRAM2 251, applies the above-described expression (Expression 1) to each one pixel to calculate the pixel position (s1x, s1y) of the SRAM1 corresponding to each pixel (s2x, s2y) of the SRAM2 251.

The result of this calculation is output to the interpolation processing section 207. The interpolation processing section 207 performs pixel-value interpolation processing using the bi-linear method described with reference to FIGS. 8A and 8B before or the bi-cubic method to determine pixel values. The determined pixel values are written into individual coordinate position of the SRAM2 251. In this regard, the count value of each pixel (s2x, s2y) of the SRAM2 251 is input from the counter 206 as a write address of the SRAM2, and the determined pixel value is written in accordance with the address position.

Figure 13:
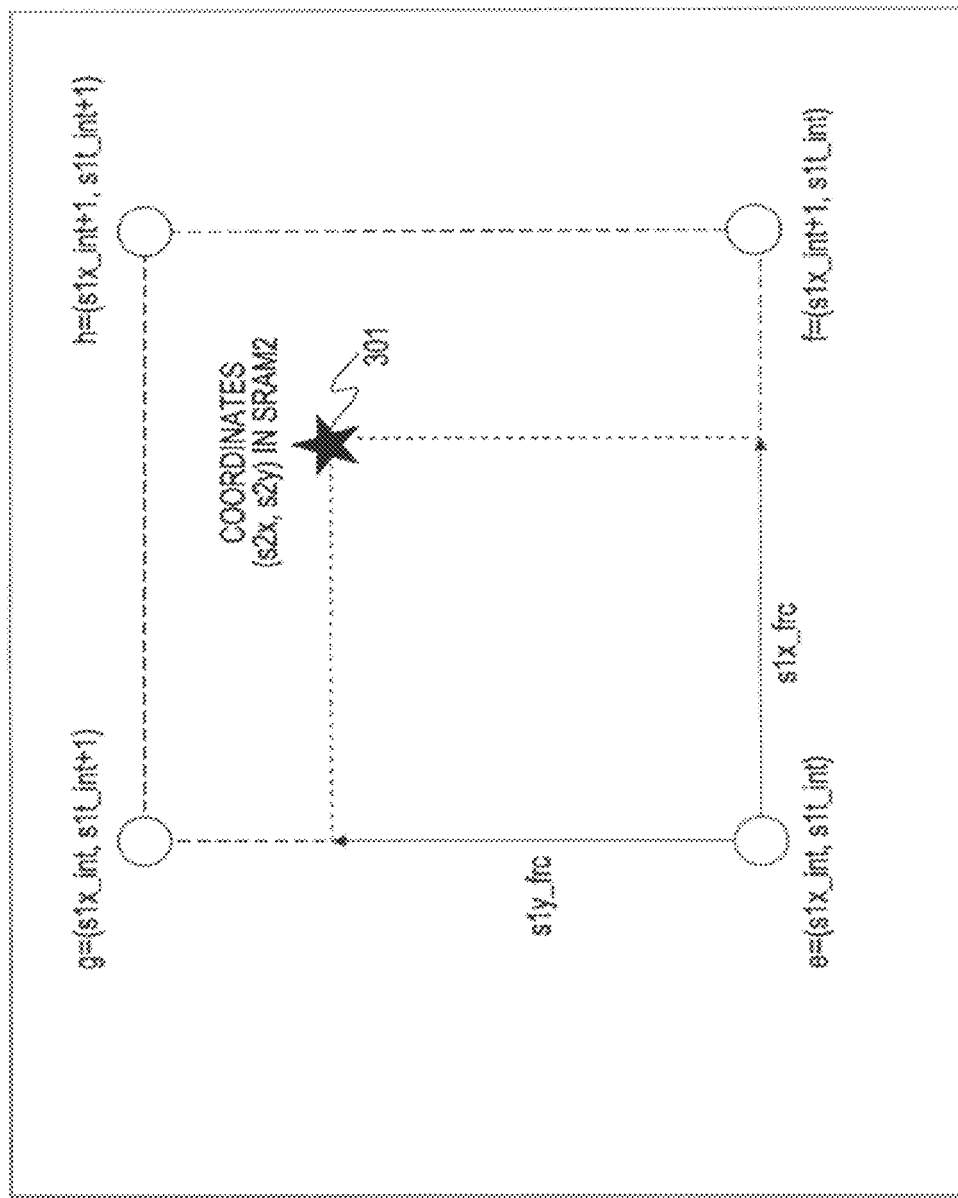
FIG. 13 is a diagram illustrating an example of processing to which a bi-linear method is applied as an example of determination processing of pixel values in the interpolation processing 207.

Referring to FIG. 13, a description will be given of an example of processing to which the bi-linear method is applied as an example of the determination processing of pixel values in the interpolation processing section 207. FIG. 13 shows a point [*] 301 in the SRAM1 coordinate system, which corresponds to one coordinate point (s2x, s2y) in the SRAM2.

The corresponding point [*] 301 does not correspond to a specific coordinate point in the SPAM1 coordinate system, and is a position surrounded by a plurality of coordinate positions (e, f, g, h). Each of the coordinate positions E, F, G, and H are coordinate points in the SRAM1 coordinates, and has the following coordinates.

E=(s1x_int, s1y_int)

F=(s1x_int+1, s1y_int)

G=(s1x_int, s1y_int+1)

H=(s1x_int+1, s1y_int+1)

The pixel points E, F, G, and H have individual values. Here, it is assumed that the individual values of the pixel points E, F, G, and H are e, f, g, and h, respectively. At this time, the interpolation processing section 207 calculates the pixel value [Q] to be set in the coordinate point (s2x, s2y) in the SRAM2 by the following expression (Expression 2) using the bi-linear method.

The above-described expression (Expression 2) is the pixel-value interpolation processing using the bi-linear method, and is the pixel-value determination processing in accordance with the processing described with reference to FIG. 8A before. That is to say, the distances (the fractional part coordinates of SRAM1) between the pixel position [*] in the SRAM1, which corresponds to the pixel (s2x, s2y) in the SRAM2 and the surrounding four points (E, F, G, and H) are obtained, and individual weights as contribution rates of individual pixel values are calculated on the basis of the obtained distances. The pixel value of the pixel (s2x, s2y) in the SRAM2 is calculated on the basis of the calculated weights. By the above-described expression, a determined pixel value is written into each coordinate position of the SRAM2 251.

In this regard, as described above, for the method of the determination processing of a pixel value in the interpolation processing section 207, not only the above-described bi-linear method, but also another method, such as a bi-cubic method, etc., may be applied.

A detailed description has been given of the present invention with reference to a specific embodiment. However, it is apparent that those skilled in the art can make modifications and substitutions of the embodiment without departing from the spirit and scope of the present invention. That is to say, the present invention has been disclosed in a form of an example, and should not be construed as limited to the embodiment described above. In order to determine the spirit and scope of the present invention, the appended claims should be considered.

In this regard, in this specification, a description has been given mainly of the embodiment in which the invention is applied to a face recognition apparatus. However, the gist of the present invention is not limited to this. The present invention can be applied to various information processing apparatus which performs conversion of face image data, and stores the data into a memory or onto a display.

Also, a series of processing described in the specification can be performed by hardware, software, or the combination of the both. When the processing is performed by software, the programs recording the processing sequence may be installed in a memory of a computer built in a dedicated hardware to be executed. Alternatively, the various programs may be installed in a general-purpose personal computer capable of executing various processing.

What is claimed is:

1. An image processing apparatus for performing an identification processing of an input face image, comprising:
    an image conversion section that receives an input of the face image to be identified, executes an image conversion on the input face image, and performs a normalization processing into an image having a predetermined setting, wherein the image conversion section obtains a face image from a first memory storing the face image to be normalization processed, performs the normalization processing by an image conversion and stores the face image after the normalization processing into a second memory;
    a calculation section that calculates a conversion parameter for calculating a corresponding point in the first memory to each pixel position in the second memory, the conversion parameter defining at least any one of an image contraction processing, an image rotation processing, or an image translation processing to be performed when the face image stored in the first memory is converted into the face image stored in the second memory;
    a similarity calculation section that calculates similarities between a feature quantity obtained from the converted input image in the image conversion section and a feature quantity of a registered face image; and
    matching determination means for determining whether the input face image matches the registered face image on the basis of the similarities calculated by the similarity calculation section, wherein the image conversion section executes the normalization processing by an image conversion processing using a center of right and left eyes of the input face image as an origin.

2. The image processing apparatus according to claim 1, wherein
    the similarity calculation section includes
        Gabor filter application means for performing a convolution operation of Gabor filter coefficients and a pixel while changing a frequency and an angle of a response function of a Gabor filter spatially expressed by a Gabor function using a Gaussian function for a window and a sine function or a cosine function as a basis for a frequency response for each feature-quantity extraction position of the converted input image converted by the image conversion section and obtaining a Gabor jet including a number of scalar values corresponding to a filter type, and
        similarity operation means for calculating similarities between Gabor jets of the input face image and Gabor jets of the registered face image for each feature-quantity extraction position, and obtaining a similarity vector including a set of similarities in a plurality of feature-quantity extraction positions, wherein the matching determination means determines whether the input face image matches the registered face image on the basis of the similarity vector.

3. An image processing apparatus for performing an identification processing of an input face image, comprising:
    an image conversion section that receives an input of the face image to be identified, executes an image conversion on the input face image, and performs a normalization processing into an image having a predetermined setting, wherein the image conversion section executes the normalization processing by an image conversion processing using a center of right and left eyes of the input face image as an origin;
    a similarity calculation section that calculates similarities between a feature quantity obtained from the converted input image in the image conversion section and a feature quantity of a registered face image; and
    matching determination means for determining whether the input face image matches the registered face image on the basis of the similarities calculated by the similarity calculation section, wherein
    the image conversion section obtains a face image from a first memory storing the face image to be normalization processed, performs the normalization processing by an image conversion and stores the face image after the normalization processing into a second memory, and includes
    a calculation section that calculates a conversion parameter for calculating a corresponding point in the first memory to each pixel position in the second memory,
    a coordinate conversion section that calculates the corresponding point in the first memory to each pixel position in the second memory on the basis of the conversion parameter calculated by the calculation section, and
    an interpolation processing section that determines a pixel value corresponding to each pixel position in the second memory in accordance with corresponding point information calculated by the coordinate conversion section.

4. The image processing apparatus according to claim 3, wherein the conversion parameter defines at least any one of an image contraction processing, an image rotation processing, or an image translation processing to be performed when the face image stored in the first memory is converted into the face image stored in the second memory, and
    the coordinate conversion section applies the conversion parameter defining the at least any one of the image contraction processing, the image rotation processing, or the image translation processing to perform a processing to calculate a corresponding point in the first memory to each pixel position in the second memory.

5. The image processing apparatus according to claim 4, wherein the coordinate conversion section calculates coordinates (s1x, s1y) in the first memory, which is an image storage memory before the normalization processing, using coordinates (s2x, s2y) in the second memory by expressions as follows:

$$s1x = (c/P) \times ((s2x) \times \cos\theta + s2y \times \sin\theta) + (org\_s1x\_frc)$$

$$s1y = (c/P) \times ((-s2x) \times \sin\theta + s2y \times \cos\theta) + (org\_s1y\_frc)$$

where s1x is an x-coordinate in a first memory coordinate system, s1y is a y-coordinate in the first memory coordinate system, s2x is an x-coordinate in a second memory coordinate system, s2y is a y-coordinate in the second memory coordinate system, and an image contraction processing parameter, an image rotation parameter, image translation processing parameters, which are input from the calculation section, are (c/P), θ, (org_s1x_frc) and (org_s1y_frc), respectively.

6. The image processing apparatus according to claim 5, wherein the translation processing parameters (org_s1x_frc, org_s1y_frc) are information indicating a position corresponding to an origin of the second memory in the first memory coordinate system.

7. The image processing apparatus according to claim 3, wherein the interpolation processing section performs a pixel-value interpolation processing to which a bi-linear method or a bi-cubic method is applied using the corresponding point calculated by the coordinate conversion section.

8. A method of processing an image for performing an identification processing of an input face image in an image processing apparatus, the method comprising:

converting an image by an image conversion section receiving an input of the face image to be identified, executing an image conversion on the input face image, and performing a normalization processing into an image having a predetermined setting, the converting including obtaining a face image from a first memory storing the face image to be normalization processed, performing the normalization processing by an image conversion, storing the face image after the normalization processing into a second memory, calculating a conversion parameter by a calculation section for calculating a corresponding point in the first memory to each pixel position in the second memory, the conversion parameter defining at least any one of an image contraction processing, an image rotation processing, or an image translation processing to be performed when the face image stored in the first memory is converted into the face image stored in the second memory, and converting coordinates by a coordinate conversion section calculating a corresponding point in the first memory to each pixel position in the second memory on the basis of the conversion parameter, the converting coordinates applying a conversion parameter defining the at least any one of the image contraction processing, the image rotation processing, or the image translation processing to perform a processing to calculate a corresponding point in the first memory to each pixel position in the second memory;

calculating similarities, by a similarity calculation section, between a feature quantity obtained from the converted input image in the converting and a feature quantity of a registered face image; and matching determining by a matching determination section determining whether the input face image matches the registered face image on the basis of the similarities calculated by the calculating, wherein the converting includes executing the normalization processing by an image conversion processing using a center of right and left eyes of the input face image as an origin.

9. The method of processing according to claim 8, wherein the calculating includes performing a convolution operation of Gabor filter coefficients and a pixel while changing a frequency and an angle of a response function of a Gabor filter spatially expressed by a Gabor function using a Gaussian function for a window and a sine function or a cosine function as a basis for a frequency response for each feature-quantity extraction position of the converted input image converted by the image conversion section and obtaining a Gabor jet including a number of scalar values corresponding to a filter type, and calculating similarities between Gabor jets of the input face image and Gabor jets of the registered face image, and obtaining a similarity vector including a set of similarities in a plurality of feature-quantity extraction positions, and the matching determining performs a matching determination processing on whether the input face image matches the registered face image on the basis of the similarity vector.

10. A method of processing an image for performing an identification processing of an input face image in an image processing apparatus, the method comprising:

converting an image by an image conversion section receiving an input of the face image to be identified, executing an image conversion on the input face image, and performing a normalization processing into an image having a predetermined setting, wherein the converting includes obtaining a face image from a first memory storing the face image to be normalization processed, performing the normalization processing by an image conversion, storing the face image after the normalization processing into a second memory, calculating a conversion parameter by a calculation section for calculating a corresponding point in the first memory to each pixel position in the second memory, converting coordinates by a coordinate conversion section calculating a corresponding point in the first memory to each pixel position in the second memory on the basis of the conversion parameter, and interpolation processing by an interpolation processing section determining a pixel value corresponding to each pixel position in the second memory in accordance with the corresponding point calculated by the converting coordinates;

calculating similarities, by a similarity calculation section, between a feature quantity obtained from the converted input image in the converting and a feature quantity of a registered face image; and matching determining by a matching determination section determining whether the input face image matches the registered face image on the basis of the similarities calculated by the calculating, wherein the converting includes executing the normalization processing by an image conversion processing using a center of right and left eyes of the input face image as an origin.

11. The method of processing according to claim 10, wherein the conversion parameter defines at least any one of an image contraction processing, an image rotation processing, or an image translation processing to be performed when the face image stored in the first memory is converted into the face image stored in the second memory, and the converting coordinates applies a conversion parameter defining the at least any one of the image contraction processing, the image rotation processing, or the image translation processing to perform a processing to calculate a corresponding point in the first memory to each pixel position in the second memory.

12. The method of processing according to claim 11, wherein the converting coordinates calculates coordinates (s1x, s1y) in the first memory, which is an image storage memory before a normalization, using coordinates (s2x, s2y) in the second memory by expressions as follows:

$$s1x=(c/P)\times((s2x)\times\cos\theta+s2y\times\sin\theta)+(org\_s1x\_frc)$$

$$s1y=(c/P)\times((-s2x)\times\sin\theta+s2y\times\cos\theta)+(org\_s1y\_frc)$$

where s1x is an x-coordinate in a first memory coordinate system, s1y is a y-coordinate in the first memory coordinate system, s2x is an x-coordinate in a second memory coordinate system, s2y is a y-coordinate in the second memory coordinate system, and an image contraction processing parameter, an image rotation parameter, image translation processing parameters, which are input from the calculation section, are (c/P), θ, (org_s1x_frc) and (org_s1y_frc), respectively.

13. The method of processing according to claim 12, wherein the translation processing parameters (org_s1x_frc, org_s1y_frc) are information indicating a position corresponding to an origin of the second memory in the first memory coordinate system.

14. The method of processing according to claim 10, wherein the interpolation processing performs a pixel-value interpolation processing to which a bi-linear method or a bi-cubic method is applied using the corresponding point calculated by the coordinate conversion section.

15. A non-transitory computer-readable medium encoded with a computer program for causing an image processing apparatus to perform an identification processing of an input face image, the identification processing comprising:
- converting an image by an image conversion section receiving an input of the face image to be identified, executing an image conversion on the input face image, and performing a normalization processing in an image having a predetermined setting,
- the converting including
  - obtaining a face image from a first memory storing the face image to be normalization processed,
  - performing the normalization processing by an image conversion,
  - storing the face image after the normalization processing into a second memory,
  - calculating a conversion parameter by a calculation section for calculating a corresponding point in the first memory to each pixel position in the second memory, the conversion parameter defining at least any one of an image contraction processing, an image rotation processing, or an image translation processing to be performed when the face image stored in the first memory is converted into the face image stored in the second memory, and
  - converting coordinates by a coordinate conversion section calculating a corresponding point in the first memory to each pixel position in the second memory on the basis of the conversion parameter, the converting coordinates applying a conversion parameter defining the at least any one of the image contraction processing, the image rotation processing, or the image translation processing to perform a processing to calculate a corresponding point in the first memory to each pixel position in the second memory;
- calculating similarities, by a similarity calculation section, between a feature quantity obtained from the converted input image in the converting and a feature quantity of a registered face image; and
- matching determining by a matching determination section determining whether the input face image matches the registered face image on the basis of the similarities calculated by the calculating, wherein the converting includes executing the normalization processing by an image conversion processing using a center of right and left eyes of the input face image as an origin.

16. An image processing apparatus for performing an identification processing of an input face image, comprising:
- an image conversion section that receives an input of the face image to be identified, executes an image conversion on the input face image, and performs a normalization processing into an image having a predetermined setting, wherein the image conversion section obtains a face image from a first memory storing the face image to be normalization processed, performs the normalization processing by an image conversion and stores the face image after the normalization processing into a second memory;
- a calculation section that calculates a conversion parameter for calculating a corresponding point in the first memory to each pixel position in the second memory, the conversion parameter defining at least any one of an image contraction processing, an image rotation processing, or an image translation processing to be performed when the face image stored in the first memory is converted into the face image stored in the second memory;
- a similarity calculation section that calculates similarities between a feature quantity obtained from the converted input image in the image conversion section and a feature quantity of a registered face image; and
- a matching determination mechanism configured to determine whether the input face image matches the registered face image on the basis of the similarities calculated by the similarity calculation section, wherein the image conversion section executes the normalization processing by an image conversion processing using a center of right and left eyes of the input face image as an origin.

* * * * *